United States Patent
Hall et al.

(10) Patent No.: US 9,424,337 B2
(45) Date of Patent: Aug. 23, 2016

(54) NUMBER OF CLUSTERS ESTIMATION

(71) Applicant: SAS Institute Inc., Cary, NC (US)

(72) Inventors: Patrick Hall, Chapel Hill, NC (US);
Ilknur Kaynar Kabul, Apex, NC (US);
Warren Sarle, Gainesville, FL (US);
Jorge Silva, Durham, NC (US)

(73) Assignee: SAS Institute Inc., Cary, NC (US)

( * ) Notice: Subject to any disclaimer, the term of this patent is extended or adjusted under 35 U.S.C. 154(b) by 288 days.

(21) Appl. No.: 14/196,299

(22) Filed: Mar. 4, 2014

(65) Prior Publication Data

US 2015/0019554 A1    Jan. 15, 2015

Related U.S. Application Data

(60) Provisional application No. 61/844,344, filed on Jul. 9, 2013.

(51) Int. Cl.
*G06F 17/30* (2006.01)
*G06K 9/62* (2006.01)

(52) U.S. Cl.
CPC ........ *G06F 17/30598* (2013.01); *G06K 9/6222* (2013.01)

(58) Field of Classification Search
CPC combination set(s) only.
See application file for complete search history.

(56) References Cited

U.S. PATENT DOCUMENTS

| | | |
|---|---|---|
| 5,325,447 A | 6/1994 | Vogt, III |
| 5,764,824 A | 6/1998 | Kurtzberg et al. |
| 6,012,058 A | 1/2000 | Fayyad et al. |
| 6,026,397 A | 2/2000 | Sheppard |
| 6,304,675 B1 | 10/2001 | Osbourn et al. |
| 6,380,937 B1 | 4/2002 | Dong et al. |
| 6,421,665 B1 | 7/2002 | Brye et al. |
| 6,728,724 B1 | 4/2004 | Megiddo et al. |

(Continued)

FOREIGN PATENT DOCUMENTS

| | | |
|---|---|---|
| CN | 101149842 | 7/2012 |
| WO | WO 9714958 | 4/1997 |

(Continued)

OTHER PUBLICATIONS

Linoff et al., Chapter 4 Statistics 101: What You Should Know About Data, Data Mining Techniques: for Marketing, Sales, and Customer Relationship Management, Third Edition, Wiley & Sons, 2011, pp. 101-149.

(Continued)

*Primary Examiner* — Shyue Jiunn Hwa
(74) *Attorney, Agent, or Firm* — Bell & Manning, LLC

(57) ABSTRACT

A method of determining a number of clusters for a dataset is provided. Centroid locations for a defined number of clusters are determined using a clustering algorithm. Boundaries for each of the defined clusters are defined. A reference distribution that includes a plurality of data points is created. The plurality of data points are within the defined boundary of at least one cluster of the defined clusters. Second centroid locations for the defined number of clusters are determined using the clustering algorithm and the reference distribution. A gap statistic for the defined number of clusters based on a comparison between a first residual sum of squares and a second residual sum of squares is computed. The processing is repeated for a next number of clusters to create. An estimated best number of clusters for the received data is determined by comparing the gap statistic computed for each iteration of the number of clusters.

25 Claims, 12 Drawing Sheets

(56) References Cited

U.S. PATENT DOCUMENTS

| | | | |
|---|---|---|---|
| 6,816,848 | B1 | 11/2004 | Hildreth et al. |
| 7,003,509 | B2 | 2/2006 | Andreev |
| 7,398,270 | B1 | 7/2008 | Choi et al. |
| 7,809,824 | B2 | 10/2010 | Wei et al. |
| 8,019,698 | B1 | 9/2011 | Dryer et al. |
| 8,190,612 | B2 | 5/2012 | Lee et al. |
| 8,229,876 | B2 | 7/2012 | Roychowdhury |
| 8,335,698 | B2 | 12/2012 | Angell et al. |
| 8,402,026 | B2 | 3/2013 | Gallivan |
| 8,489,531 | B2 | 7/2013 | Ben Hur et al. |
| 8,606,787 | B1 | 12/2013 | Asgekar et al. |
| 8,713,021 | B2 | 4/2014 | Bellegarda |
| 2002/0091655 | A1 | 7/2002 | Agrafiotis et al. |
| 2005/0071140 | A1* | 3/2005 | Ben-Hur ........... G06F 17/30705 703/11 |
| 2006/0048026 | A1 | 3/2006 | Fine et al. |
| 2006/0093222 | A1 | 5/2006 | Saffer et al. |
| 2007/0087756 | A1 | 4/2007 | Hoffberg |
| 2008/0046808 | A1 | 2/2008 | Malkin et al. |
| 2008/0069458 | A1 | 3/2008 | Vega-Higuera et al. |
| 2009/0164171 | A1 | 6/2009 | Wold et al. |
| 2010/0076690 | A1* | 3/2010 | Reja ........................ G06F 19/24 702/19 |
| 2013/0042172 | A1 | 2/2013 | Mansfield et al. |
| 2013/0297607 | A1 | 11/2013 | Ben-Hur et al. |
| 2014/0012848 | A1 | 1/2014 | Denney et al. |

FOREIGN PATENT DOCUMENTS

| | | |
|---|---|---|
| WO | WO 0016250 | 3/2000 |
| WO | WO 0120536 A2 | 3/2001 |
| WO | WO 0120536 A3 | 3/2001 |
| WO | WO 2012119206 | 9/2012 |
| WO | WO 2013126281 | 8/2013 |

OTHER PUBLICATIONS

Linoff et al., Chapter 9 Nearest Neighbor Approaches: Memory-Based Reasoning and Collaborative Filtering, Data Mining Techniques: For Marketing, Sales, and Customer Relationship Management, Third Edition, Wiley & Sons, 2011, pp. 321-355.

Linoff et al., Chapter 13 Finding Islands of Similarity: Automatic Cluster Detection, Data Mining Techniques: For Marketing, Sales, and Customer Relationship Management, Third Edition, Wiley & Sons, 2011, pp. 459-498.

Linoff et al., Chapter 14 Alternative Approaches to Cluster Detection, Data Mining Techniques: For Marketing, Sales, and Customer Relationship Management, Third Edition, Wiley & Sons, 2011, pp. 499-533.

Y. Versley, Decorrelation and Shallow Semantic Patterns for Distributional Clustering of Nouns and Verbs, May 16, 2014.

Claim Prediction Challenge (Allstate), http://www.kaggle.com/c/ClaimPredictionChallenge, Jul. 13, 2011.

TwoStep Cluster Analysis, Available from http://www-01.ibm.com/support/knowledgecenter/SSLVMB_20.0.0/com.ibm.spss.statistics.help/idh_twostep_main.htm on May 30, 2014.

R. Kabacoff, Quick-R accessing the power of R, Available from http://www.statmethods.net/advstats/cluster.html on May 30, 2014.

Maechler, Cluster Analysis Extended, Package 'cluster', version 1.15.3, Sep. 4, 2014, pp. 1-79.

Leisch et al., CRAN Task View: Cluster Analysis & Finite Mixture Models, Available from http://cran.r-project.org/web/views/Cluster.html on May 30, 2014.

Hierarchical Cluster Analysis, Available from http://www.r-tutor.com/gpu-computing/clustering/hierarchical-cluster-analysis on May 30, 2014.

J. Oksanen, Cluster Analysis: Tutorial with R, Jan. 26, 2014, pp. 1-13.

kmeans, Available from http://www.mathworks.com/help/stats/kmeans.html on May 30, 2014.

Lab 13—Cluster Analysis, Available from http://ecology.msu.montana.edu/labdsv/R/labs/lab13/lab13.html on May 30, 2014.

Fuzzy Clustering, Available from http://www.mathworks.com/help/fuzzy/fuzzy-clustering.html on May 30, 2014.

Color-Based Segmentation Using K-Means Clustering, Available from http://www.mathworks.com/help/images/examples/color-based-segmentation-using-k-means-clustering.html on May 30, 2014.

Linoff et al., Chapter 16 Link Analysis, Data Mining Techniques: For Marketing, Sales, and Customer Relationship Management, Third Edition, Wiley & Sons, 2011, pp. 581-612.

Hageman et al., Bagged K-Means Clustering of Metabolome Data, Critical Reviews in Analytical Chemistry, vol. 36, 2006, pp. 211-220.

Li et al., K-Means Clustering with Bagging and MapReduce, Proceedings of the 44th Hawaii International Conference on System Sciences, 2011, pp. 1-8.

Strehl et al., Cluster Ensembles—A Knowledge Reuse Framework for Combining Multiple Partitions, Journal of Machine Learning Research, vol. 3, Dec. 2002, pp. 583-617.

Hinton et al., Reducing the Dimensionality of Data with Neural Networks, Science, vol. 313, Jul. 28, 2006, pp. 504-507.

B.W. Silverman, Using Kernel Density Estimates to investigate Multimodality, J.R. Statist. Soc. B, vol. 43, No. 1, 1981, pp. 97-99.

M. C. Minnotte, Mode testing via higher-order density estimation, Comput Stat, vol. 25, Feb. 11, 2010, pp. 391-407.

W.S. Sarle, SAS Institute Inc., SAS® Technical Report A-108, Cubic Clustering Criterion, Cary, NC: SAS Institute Inc., 1983.

P.J. Rousseeuw, Silhouettes: a graphical aid to the interpretation and validation of cluster analysis, Journal of Computational and Applied Mathematics, vol. 20, 1987, pp. 53-65.

The SPSS TwoStep Cluster Component, SPSS, 2001, pp. 1-9.

McCullagh et al., How many clusters?, Bayesian Analysis, vol. 3, No. 1, 2008, pp. 101-120.

A.D. Gordon, Chapter 4 Hierarchical classifications, Classification, 2nd Edition, Chapman and Hall-CRC, 1999, pp. 69-109.

A.D. Gordon, Chapter 5 Other clustering procedures, Classification, 2nd Edition, Chapman and Hall-CRC, 1999, pp. 111-146.

A.D. Gordon, Chapter 7 Cluster validation and description, Classification, 2nd Edition, Chapman and Hall-CRC, 1999, pp. 183-211.

Hall et al., An Overview of Machine Learning with SAS® Enterprise Miner™, SAS/STAT Software Paper SAS313-2014., Mar. 25, 2009, Cary, NC: SAS Institute Inc. pp. 1-24.

Giarratano et al., Chapter 12 Expert System Design Examples, Expert Systems, Third Edition, Boston, PWS Publishing Company, 1998, pp. 513-526.

Agrawal et al., Mining Association Rules between Sets of Items in Large Databases, ACM SIGMOD, 1993, pp. 207-216.

Belkin et al., Manifold Regularization: A Geometric Framework for Learning from Labeled and Unlabeled Examples, Journal of Machine Learning Research, vol. 7, Nov. 2006, pp. 2399-2434.

L. Breiman, Random Forests, Machine Learning, vol. 45, 2001, pp. 5-32.

L. Breiman, Statistical Modeling: The Two Cultures, Statistical Science, vol. 16, No. 3, 2001, pp. 199-215.

Breiman et al., Chapter 4 Splitting Rules, Classification and Regression Trees, Wadsworth International Group, Belmont, CA, 1984, pp. 93-129.

Breiman et al., Chapter 8 Regression Trees, Classification and Regression Trees, Wadsworth International Group, Belmont, CA, 1984, pp. 216-265.

Breiman et al., Chapter 10 Optimal Pruning, Classification and Regression Trees, Wadsworth International Group, Belmont, CA, 1984, pp. 279-296.

Y. Cheng, Mean Shift, Mode Seeking, and Clustering, IEEE Transactions on Pattern Analysis and Machine Intelligence, vol. 17, No. 8, Aug. 1995, pp. 790-799.

Cortes et al., Support-Vector Networks, Machine Learning, vol. 20, 1995, pp. 273-297.

Cover et al., Nearest Neighbor Pattern Classification, IEEE Transactionsons on Information Theory, vol. IT-13, No. 1, Jan. 1967, pp. 21-27.

de Ville et al., Chapter 3 The Mechanics of Decision Tree Construction, Decision Trees for Analytics Using SAS® Enterprise Miner™, Jun. 2013, pp. 55-115.

(56) References Cited

OTHER PUBLICATIONS de Ville et al., Chapter 6 The Integration of Decision Trees with Other Data Mining Approaches , Decision Trees for Analytics Using SAS® Enterprise Miner™, Jun. 2013, pp. 187-217.
J.H. Friedman, Greedy Function Approximation: A Gradient Boosting Machine, The Annals of Statistics, vol. 29, No. 5 , Oct. 2001, pp. 1189-1232.
Friedman et al., Bayesian Network Classifiers, Machine Learning, vol. 29, 1997, pp. 131-163.
Golub et al., Singular Value Decomposition and Least Squares Solutions, Numer. Math., vol. 14, 1970, pp. 403-420.
Hartigan et al., Algorithm AS 136: A K-Means Clustering Algorithm, Journal of the Royal Statistical Society. Series C (Applied Statistics), vol. 28, No. 1, 1979, pp. 100-108.
Hunt et al., Chapter 3 Concept Learning System 1. Basic Results, Experiments in Induction, Academic Press, New York, 1966, pp. 45-69.
T. Joachims, Transductive Inference for Text Classification using Support Vector Machines, Machine Learning Proceedings of the Sixteenth International Conference, 1999, pp. 200-209.
Lee et al., Learning the parts of objects by non-negative matrix factorization, Nature, vol. 401, Oct. 21, 1999, pp. 788-791.
J. Lighthill, Artificial Intelligence: a paper symposium, Swindon, UK: Science Research Council, 1973.
McCulloch et al., A Logical Calculus of the Ideas Immanent in Nervous Activity , Bulletin of Mathematical Biophysics, vol. 5, 1943, pp. 115-133.
Minsky et al., Geometric Theory of Linear Inequalities, Perceptrons: An Introduction to Computational Geometry, The Massachusetts Institute of Technology, 1969, pp. 69-72.
Minsky et al., A Geometric Property with Unbounded Order, Perceptrons: An Introduction to Computational Geometry, The Massachusetts Institute of Technology, 1969, pp. 73-95.
Le et al., On Optimization Methods for Deep Learning, Proceedings of the 28th International Conference on Machine Learning, 2011.
Nigam et al., Text Classification from Labeled and Unlabeled Documents using EM, Machine Learning, vol. 39, 2000, pp. 103-134.
M. Panik, Chapter 2 Bivariate Linear Regression and Correlation , Regression Modeling: Methods, Theory, and Computation with SAS, CRC Press, Boca Raton, FL, 2009, pp. 23-105.
M. Panik, Chapter 7 Robust Regression , Regression Modeling: Methods, Theory, and Computation with SAS, CRC Press, Boca Raton, FL, 2009, pp. 291-299.
M. Panik, Chapter 9 Random Coefficients Regression, Regression Modeling: Methods, Theory, and Computation with SAS, CRC Press, Boca Raton, FL, 2009, pp. 369-376.
F. Rosenblatt, The Perceptron: A Probabilistic Model for Information Storage and Organization in the Brain, Psychological Review, vol. 65, No. 6, 1958, pp. 386-408.
Rumelhart et al., Learning representations by back-propagating errors, Nature, vol. 323, Oct. 9, 1986, pp. 533-536.
Schölkopf et al., Kernel Principal Component Analysis, In Artificial Neural Networks, Berlin, 1997, pp. 583-588.
F. Sebastiani , Machine Learning in Automated Text Categorization, ACM Computing Surveys, vol. 34, No. 1, Mar. 2002, pp. 1-47.
M. Seeger, Gaussian Processes for Machine Learning, International Journal of Neural Systems, vol. 14, No. 2, 2004, pp. 69-106.
B.W. Silverman, Chapter 5 Three important methods, Density Estimation for Statistics and Data Analysis, Chapman and Hall, London, GB, 1986, pp. 95-100.
B.W. Silverman, Chapter 6 Density estimation in action, Density Estimation for Statistics and Data Analysis, Chapman and Hall, London, GB, 1986, pp. 130-137.
Vincent et al., Extracting and Composing Robust Features with Denoising Autoencoders, Proceedings of the 25th International Conference on Machine Learning, Helsinki, Finland, 2008, pp. 1096-1103.
U. von Luxburg, A tutorial on spectral clustering, Stat Comput, vol. 17, 2007, pp. 395-416.
R. Davis, Knowledge Acquisition in Rule-Based Systems—Knowledge About Representations as a Basis for System Construction and Maintenance , Pattern-Directed Inference Systems, Waterman et al., New York, Academic Press, 1978, pp. 99-134.
F. Hayes-Roth, The Role of Partial and Best Matches in Knowledge Systems , Pattern-Directed Inference Systems, Waterman et al., New York, Academic Press, 1978, pp. 557-577.
Zou et al., Sparse Principal Component Analysis, Journal of Computational and Graphical Statistics, vol. 15, No. 2, Jun. 2006, pp. 265-286.
k-means clustering, Available from http://en.wikipedia.org/wiki/K-means_clustering on May 30, 2014.
Hariharan et al., Discriminative Decorrelation for Clustering and Classification, European Conference on Computer Vision, 2012, pp. 1-14.
Orme et al., Improving K-Means Cluster Analysis: Ensemble Analysis Instead of Highest Reproducibility Replicates, Copyright Sawtooth Software, 2008, pp. 1-11.
T. Kohonen, Optimal Associative Mappings, Chapter 6 of Self-Organization and Associative Memory, Springer-Verlag, Berlin, 1984, pp. 158-184.
T. Kohonen, Pattern Recognition, Chapter 7 of Self-Organization and Associative Memory, Springer-Verlag, Berlin, 1984, pp. 185-209.
Yang et al., How many clusters?, Bayesian Analysis, vol. 3, No. 1, 2008, pp. 101-120.
Tibshirani et al., Estimating the number of clusters in a data set via the gap statistic, J. R. Statist. Soc. B, vol. 63, Part 2, 2001, pp. 411-423.
Goswami et al., Evolutionary Monte Carlo Methods for Clustering, Journal of Computational and Graphical Statistics, vol. 16, No. 4, 2007, pp. 1-22.
Chapter 6 The HPCLUS Procedure, SAS Institute Inc. 2013. SAS® Enterprise Miner™ 13.1: High-Performance Procedures. Cary, NC: SAS Institute Inc., pp. 78-102.

\* cited by examiner

NUMBER OF CLUSTERS ESTIMATION

CROSS-REFERENCE TO RELATED APPLICATIONS

The present application claims the benefit of 35 U.S.C. §119(e) to U.S. Provisional Patent Application No. 61/844,344 filed on Jul. 9, 2013, the entire contents of which are hereby incorporated by reference.

BACKGROUND

Given a data matrix X of size n by p, clustering assigns the observations (rows of X) to clusters, or groups based on some or all of the data variables (columns of X). Clustering is a cornerstone of business intelligence, with wide-ranging applications such as market segmentation and fraud detection.

SUMMARY

In an example embodiment, a method of determining a number of clusters for a dataset is provided. Data to cluster is received. A number of clusters to create is defined. Centroid locations for the defined number of clusters are determined using a clustering algorithm and the received data to define clusters. Boundaries for each of the defined clusters are defined. A reference distribution that includes a plurality of data points is created. The plurality of data points are within the defined boundary of at least one cluster of the defined clusters. Second centroid locations for the defined number of clusters are determined using the clustering algorithm and the created reference distribution to define second clusters. A gap statistic for the defined number of clusters is computed based on a comparison between a first residual sum of squares computed for the defined clusters and a second residual sum of squares computed for the defined second clusters. The processing is repeated for a next number of clusters to create as the defined number of clusters. An estimated best number of clusters for the received data is determined by comparing the gap statistic computed for each iteration.

In another example embodiment, a computer-readable medium is provided having stored thereon computer-readable instructions that, when executed by a computing device, cause the computing device to perform the method of determining a number of clusters for a dataset.

In yet another example embodiment, a computing device is provided. The system includes, but is not limited to, a processor and a computer-readable medium operably coupled to the processor. The computer-readable medium has instructions stored thereon that, when executed by the computing device, cause the computing device to perform the method of determining a number of clusters for a dataset.

In still another example embodiment, a system is provided. The system includes, but is not limited to, a first computing device comprising a first processor and a first computer-readable medium and a second computing device comprising a second processor and a second computer-readable medium. The first computer-readable medium is operably coupled to the first processor and has first computer-readable instructions stored thereon that, when executed by the first processor, cause the first computing device to perform a first portion of the method of determining a number of clusters for a dataset. The second computer-readable medium is operably coupled to the second processor and has second computer-readable instructions stored thereon that, when executed by the second processor, cause the second computing device to perform a second portion of the method of determining a number of clusters for a dataset.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
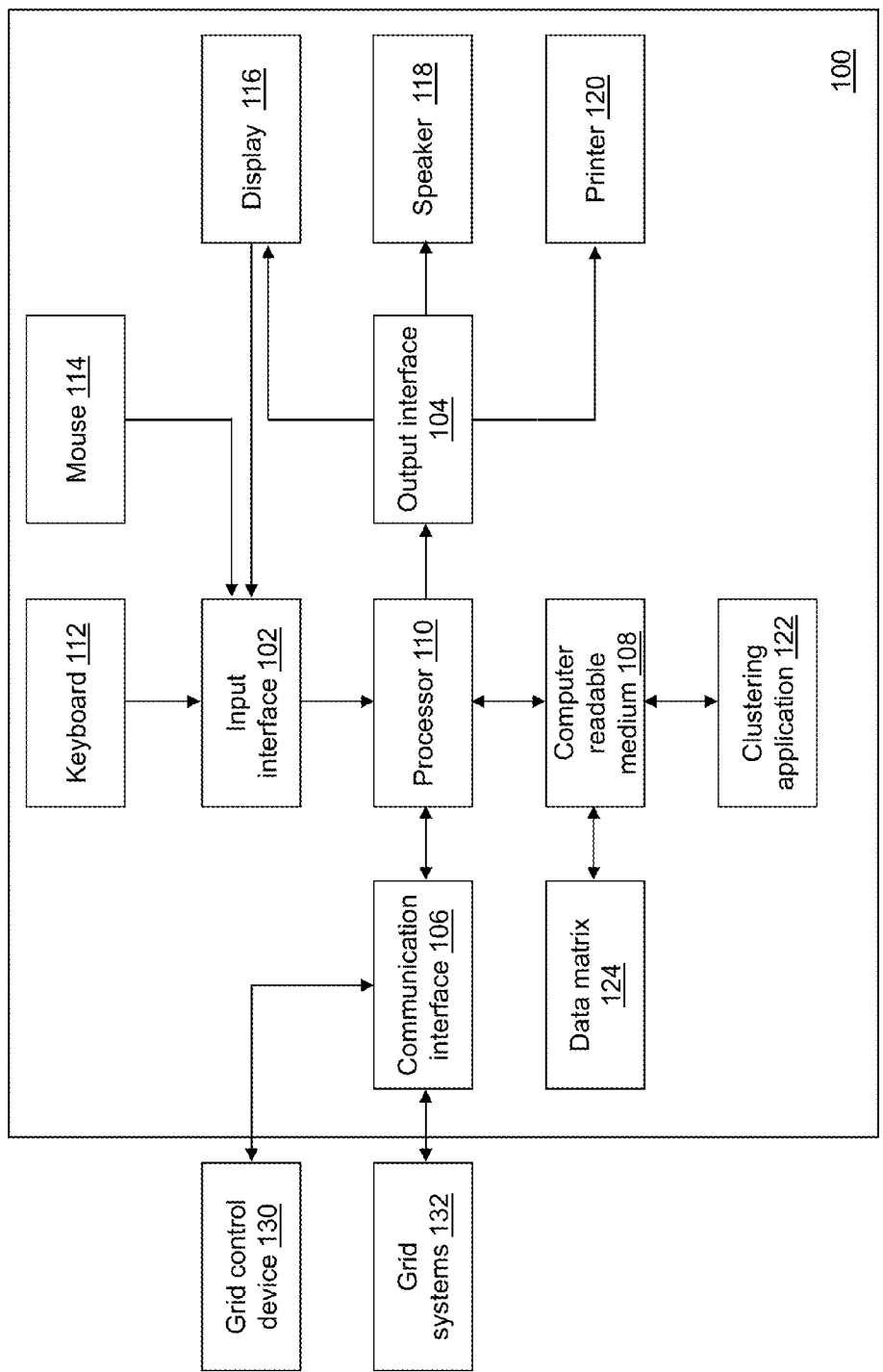
FIG. 1 depicts a block diagram of a data access device in accordance with an illustrative embodiment.

Referring to FIG. 1, a block diagram of a data access device 100 is shown in accordance with an illustrative embodiment. Data access device 100 may include an input interface 102, an output interface 104, a communication interface 106, a computer-readable medium 108, a processor 110, a clustering application 122, and a data matrix 124. Fewer, different, and/or additional components may be incorporated into data access device 100.

Input interface 102 provides an interface for receiving information from the user for entry into data access device 100 as understood by those skilled in the art. Input interface 102 may interface with various input technologies including, but not limited to, a keyboard 112, a mouse 114, a display 116, a track ball, a keypad, a microphone, one or more buttons, etc. to allow the user to enter information into data access device 100 or to make selections presented in a user interface displayed on the display. The same interface may support both input interface 102 and output interface 104. For example, a display comprising a touch screen both allows user input and presents output to the user. Data access device 100 may have one or more input interfaces that use the same or a different input interface technology. The input interface technology further may be accessible by data access device 100 through communication interface 106.

Output interface 104 provides an interface for outputting information for review by a user of data access device 100. For example, output interface 104 may interface with various output technologies including, but not limited to, display 116, a speaker 118, a printer 120, etc. Data access device 100 may have one or more output interfaces that use the same or a different output interface technology. The output interface technology further may be accessible by data access device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Data access device 100 may have one or more communication interfaces that use the same or a different communication interface technology. For example, data access device 100 may support communication using an Ethernet port, a Bluetooth antenna, a telephone jack, a USB port, etc. Data and messages may be transferred between data access device 100 and a grid control device 130 and/or grid systems 132 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Data access device 100 may have one or more computer-readable media that use the same or a different memory media technology. Data access device 100 also may have one or more drives that support the loading of a memory media such as a CD, DVD, an external hard drive, etc. One or more external hard drives further may be connected to data access device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Data access device 100 may include a plurality of processors that use the same or a different processing technology.

Clustering application 122 performs operations associated with clustering data stored in data matrix 124. Some or all of the operations described herein may be embodied in clustering application 122. The operations may be implemented using hardware, firmware, software, or any combination of these methods. Referring to the example embodiment of FIG. 1, clustering application 122 is implemented in software (comprised of computer-readable and/or computer-executable instructions) stored in computer-readable medium 108 and accessible by processor 110 for execution of the instructions that embody the operations of clustering application 122. Clustering application 122 may be written using one or more programming languages, assembly languages, scripting languages, etc.

Clustering application 122 may be implemented as a Web application. For example, clustering application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Data matrix 124 includes a plurality of rows and one or more columns. The rows of data matrix 124 may be referred to as observations and the columns associated with an observation may be referred to as data points, representing variables, for the observation. Of course, in an alternative embodiment, data matrix 124 may be transposed.

The data stored in data matrix 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. Data matrix 124 may be stored in computer-readable medium 108 or on one or more other computing devices and accessed using communication interface 106. For example, data matrix 124 may be stored in a cube distributed across a grid of computers as understood by a person of skill in the art. Data matrix 124 may be stored using various formats as known to those skilled in the art including a file system, a relational database, a system of tables, a structured query language database, etc.

Figure 2:
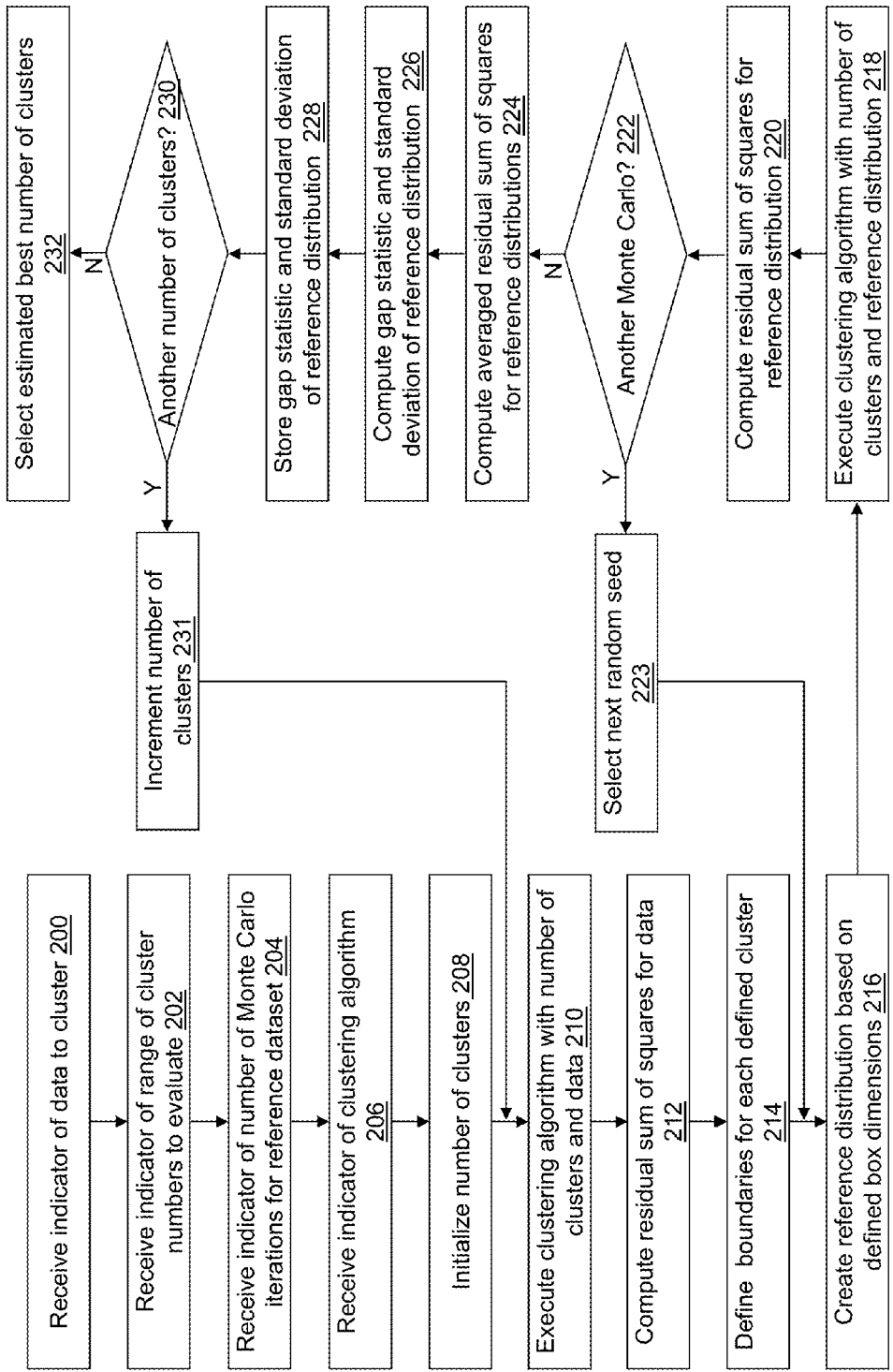
FIG. 2 depicts a flow diagram illustrating examples of operations performed by the data access device of FIG. 1 in accordance with an illustrative embodiment.

Referring to FIG. 2, example operations associated with clustering application 122 are described. Additional, fewer, or different operations may be performed depending on the embodiment. The order of presentation of the operations of FIG. 2 is not intended to be limiting. Although some of the operational flows are presented in sequence, the various operations may be performed in various repetitions, concurrently (in parallel, for example, using threads), and/or in other orders than those that are illustrated. For example, a user may execute clustering application 122, which causes presentation of a first user interface window, which may include a plurality of menus and selectors such as drop down menus, buttons, text boxes, hyperlinks, etc. associated with clustering application 122 as understood by a person of skill in the art. As used herein, an indicator indicates one or more user selections from a user interface, one or more data entries into a data field of the user interface, one or more data items read from computer-readable medium 108 or otherwise defined with one or more default values, etc.

In an operation 200, a first indicator of data to cluster is received. For example, the first indicator indicates a location of data matrix 124. As an example, the first indicator may be received by clustering application 222 after selection from a user interface window or after entry by a user into a user interface window. The first indicator may further indicate that only a portion of the data stored in data matrix 124 be clustered. For example, in a large dataset only a subset of the observations may be used. First indicator may indicate a number of observations to include, a percentage of observations of the entire dataset to include, etc. A subset may be created from data matrix 124 by sampling. An example sampling algorithm is uniform sampling. Other random sampling algorithms may be used. Additionally, only a subset of the data points (columns) for each observation may be used to determine the clusters. The first indicator also may indicate a subset of the columns (variables) to use to determine the clusters. In an alternative embodiment, the data to cluster may not be selectable. For example, a most recently created data set may be used automatically.

In an operation 202, a second indicator of a range of numbers of clusters to evaluate is received. For example, the second indicator indicates a minimum number of clusters to evaluate and a maximum number of clusters to evaluate. The second indicator may further indicate an increment that is used to define an incremental value for incrementing from the minimum to the maximum number of clusters or vice versa. Of course, the incremental value may be or default to one. The second indicator may be received by clustering application 122 after selection from a user interface window or after entry by a user into a user interface window. Default values for the range of numbers of clusters to evaluate may further be stored, for example, in computer-readable medium 108. In an alternative embodiment, the range of numbers of clusters to evaluate may not be selectable.

In an operation 204, a third indicator of a number of Monte Carlo iterations to execute for a reference dataset is received. The third indicator may be received by clustering application 222 after a selection from a user interface window or after entry by a user into a user interface window, for example. A default value for the number of Monte Carlo iterations to execute for generating reference datasets may further be stored, for example, in computer-readable medium 108. In an alternative embodiment, the number of Monte Carlo iterations may not be selectable.

In an operation 206, a fourth indicator of a clustering algorithm to execute to cluster the data and the reference dataset is received. For example, the fourth indicator indicates a name of a clustering algorithm. The fourth indicator may be received by clustering application 122 after selection from a user interface window or after entry by a user into a user interface window. A default value for the clustering algorithm to execute may further be stored, for example, in computer-readable medium 108. In an alternative embodiment, the clustering algorithm may not be selectable.

In an operation 208, a number of clusters is initialized. For example, the number of clusters may be initialized to the minimum number of clusters to evaluate or the maximum number of clusters to evaluate defined in operation 202.

In an operation 210, the clustering algorithm indicated in operation 206 is executed to cluster the data indicated in operation 200 into the defined number of clusters. The number of clusters may be defined based on the initialized number of clusters defined in operation 208 or in an operation 231.

The executed clustering algorithm may be selected for execution based on the fourth indicator. The data may be received from one or more devices through communication interface 106 and/or may be received from storage in computer-readable medium 108. Example clustering algorithms include the k-means algorithm, Ward's minimum-variance algorithm, a hierarchical algorithm, a median algorithm, McQuitty's similarity analysis algorithm, or other algorithms based on minimizing the cluster residual sum of squares. The clustering algorithm performs a cluster analysis on the basis of distances that are computed from one or more variables. The data points are divided into clusters such that each observation belongs to a single cluster. Additionally, the clustering algorithm defines a centroid for each cluster.

In an operation 212, a first residual sum of squares is computed for the defined clusters as $W_k = \Sigma_{j=1}^{k} \Sigma_{i=1}^{n_j} \|x_{i,j} - c_j\|^2$, where k is the defined number of clusters, $n_j$ is a number of data points in cluster j of the defined clusters, $x_{i,j}$ is an ith data point in cluster j of the defined clusters, and $c_j$ is a centroid location of cluster j of the defined clusters.

In an operation 214, a boundary is defined for each of the clusters defined in operation 210. For example, a minimum value and a maximum value are defined for each dimension of each cluster to define a possibly multi-dimensional box depending on a number of the one or more variables defined in operation 200.

Optionally, the data to cluster may be transformed before defining the boundaries for each cluster. For example, principal component analysis (PCA) may be performed on the data in each cluster to convert the observations in each cluster to linearly uncorrelated variables called principal components. PCA may refer to a multivariate technique for examining relationships among several variables. Each principal component can be a linear combination of the original variables with coefficients equal to the eigenvectors of the correlation or covariance matrix. The eigenvectors are orthogonal so the principal components represent jointly perpendicular directions through the space of the original variables. An eigenvector and an eigenvalue may be determined for each dimension of each of the defined clusters based on the principal components analysis. To perform PCA, the raw data may be used or the raw data may be converted to another form such as a covariance matrix as understood by a person of skill in the art.

A length for each dimension of each cluster is determined as a proportion of the determined eigenvalue for the respective dimension. For illustration, the proportion of the determined eigenvalue is 0.75-1.0. The boundaries of each cluster can be defined as a box with a center of the box as a centroid location of the respective cluster in the transformed space. A first boundary point for each dimension can be defined as the center of the box plus the determined length of the respective dimension aligned with the determined eigenvector of the respective dimension. A second boundary point for each dimension is defined as the center of the box minus the determined length of the respective dimension aligned with the eigenvector of the respective dimension.

In an operation 216, a reference distribution is created. The reference distribution includes a new plurality of data points. The new plurality of data points are created within the defined boundary of at least one cluster of the defined clusters. The new data points may be selected based on a uniform distribution within the boundary of each defined cluster. For example, a first plurality of data points are created within the boundary defined for a first cluster of the defined clusters, a second plurality of data points are created within the boundary defined for a second cluster of the defined clusters, a third plurality of data points are created within the boundary defined for a third cluster of the defined clusters, and so on up to the number of clusters created.

In an illustrative embodiment, $n_j^*$, a number of data points in cluster j of the reference distribution is selected based on $n_j$, the number of data points in cluster j of the clusters defined in operation 210. For example, $n_j^*$ may be proportional to $n_j$. The proportion may be less than one, equal to one, or greater than one. In another illustrative embodiment, $n_j^*$ is a predetermined number of data points regardless of the value of $n_j$. The reference distribution data may be created and stored on one or more devices and/or on computer-readable medium 108.

Figure 8:
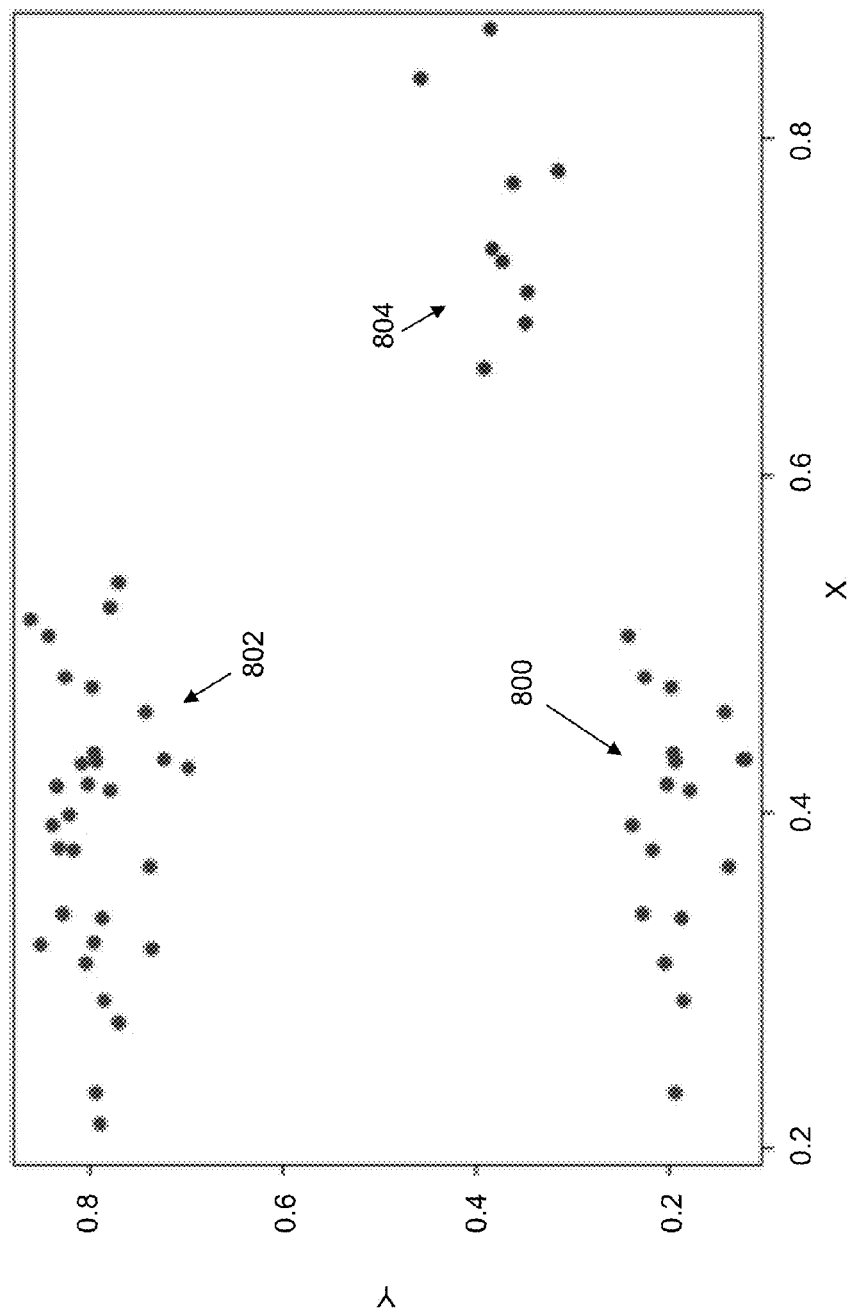
FIG. 8 depicts an example dataset containing three elongated clusters.

FIGS. 8 to 11 illustrate the process of creating a reference distribution in operation 216. Referring to FIG. 8, a sample dataset selected for clustering is shown. The sample dataset includes a first plurality of points 800, a second plurality of points 802, and a third plurality of points 804 that generally form three, visually distinct clusters.

Figure 9:
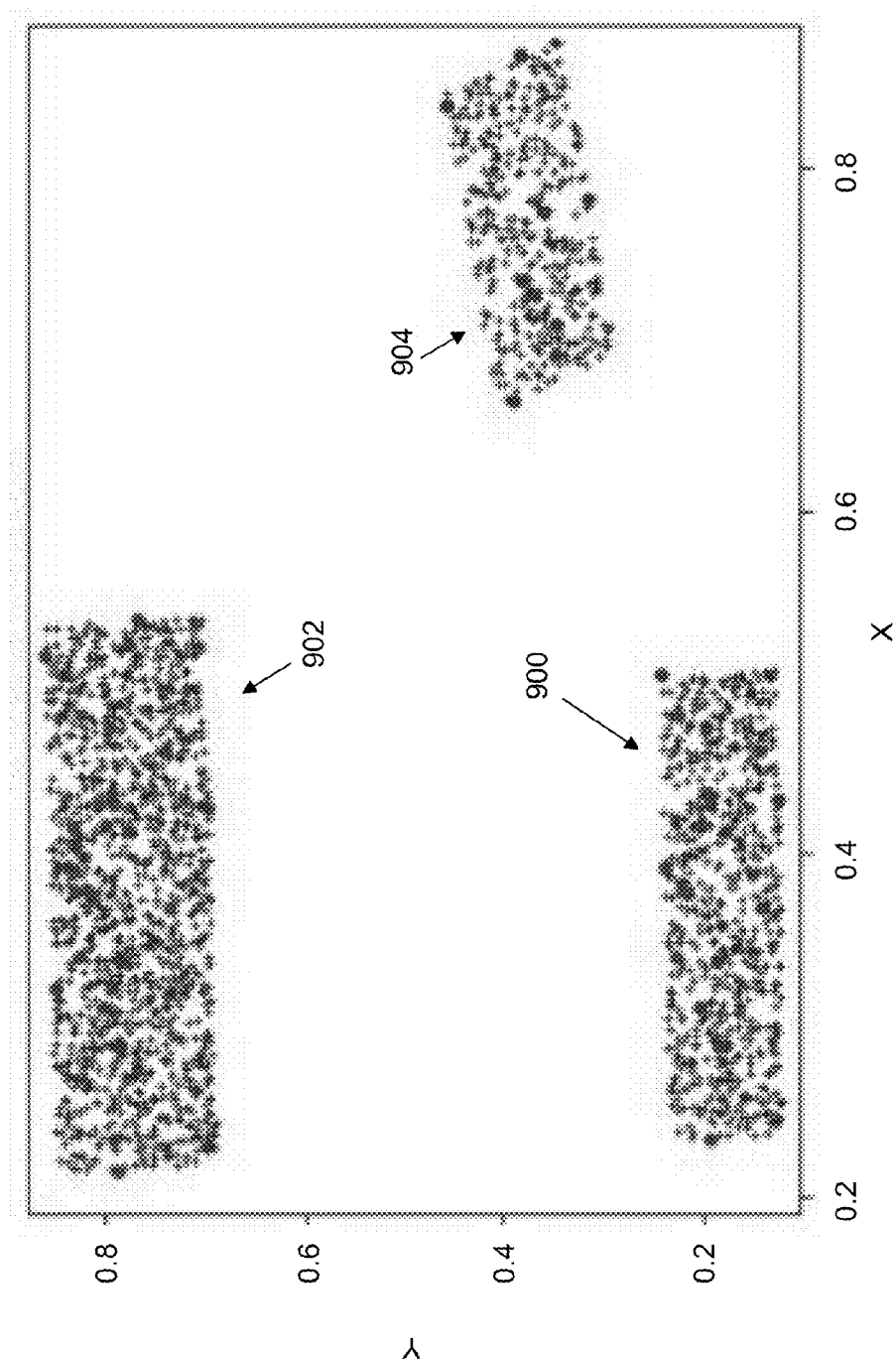
FIG. 9 depicts creation of three example reference distributions created for the example dataset of FIG. 8.

Referring to FIG. 9, three clusters were created for the sample dataset in FIG. 8 using a k-means clustering algorithm. Principal components analysis was performed on each of the created clusters and the boundaries were defined for each cluster based on the eigenvector and the eigenvalue determined for each dimension of each of the three clusters. A reference distribution was created by defining data points within the boundaries of each of the cluster boundaries. The reference distribution includes a first cluster distribution 900, a second cluster distribution 902, and a third cluster distribution 904.

Figure 10:
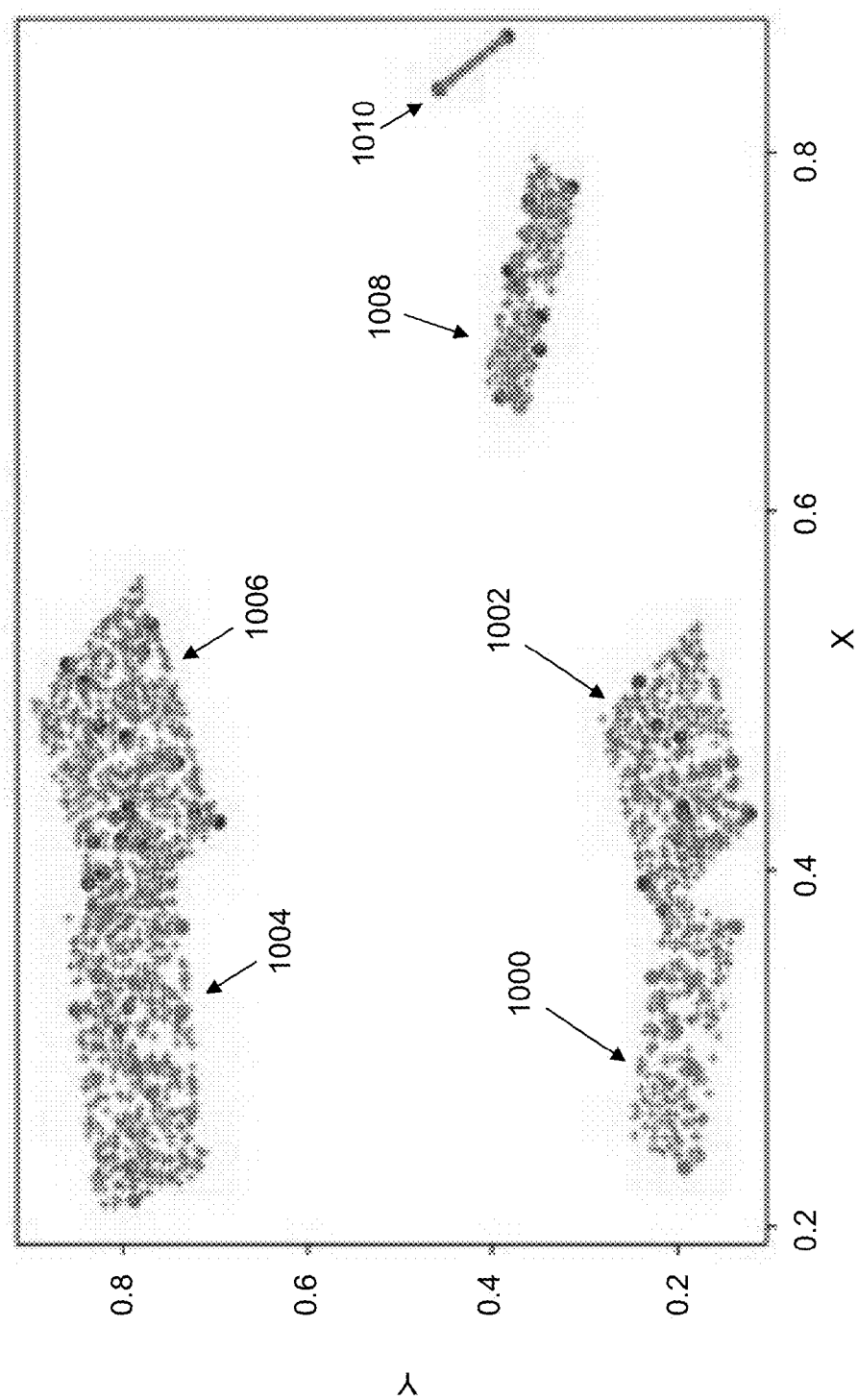
FIG. 10 depicts creation of six example reference distributions created for the example dataset of FIG. 8.

Referring to FIG. 10, six clusters were created for the sample dataset in FIG. 8 using a k-means clustering algorithm. Principal components analysis was performed on each of the created clusters and the boundaries were defined for each cluster based on the eigenvector and the eigenvalue determined for each dimension of each of the six clusters. A reference distribution was created by defining data points within the boundaries of each of the clusters. The reference distribution includes a first cluster distribution 1000, a second cluster distribution 1002, a third cluster distribution 1004, a fourth cluster distribution 1006, a fifth cluster distribution 1008, and a sixth cluster distribution 1010.

Figure 11:
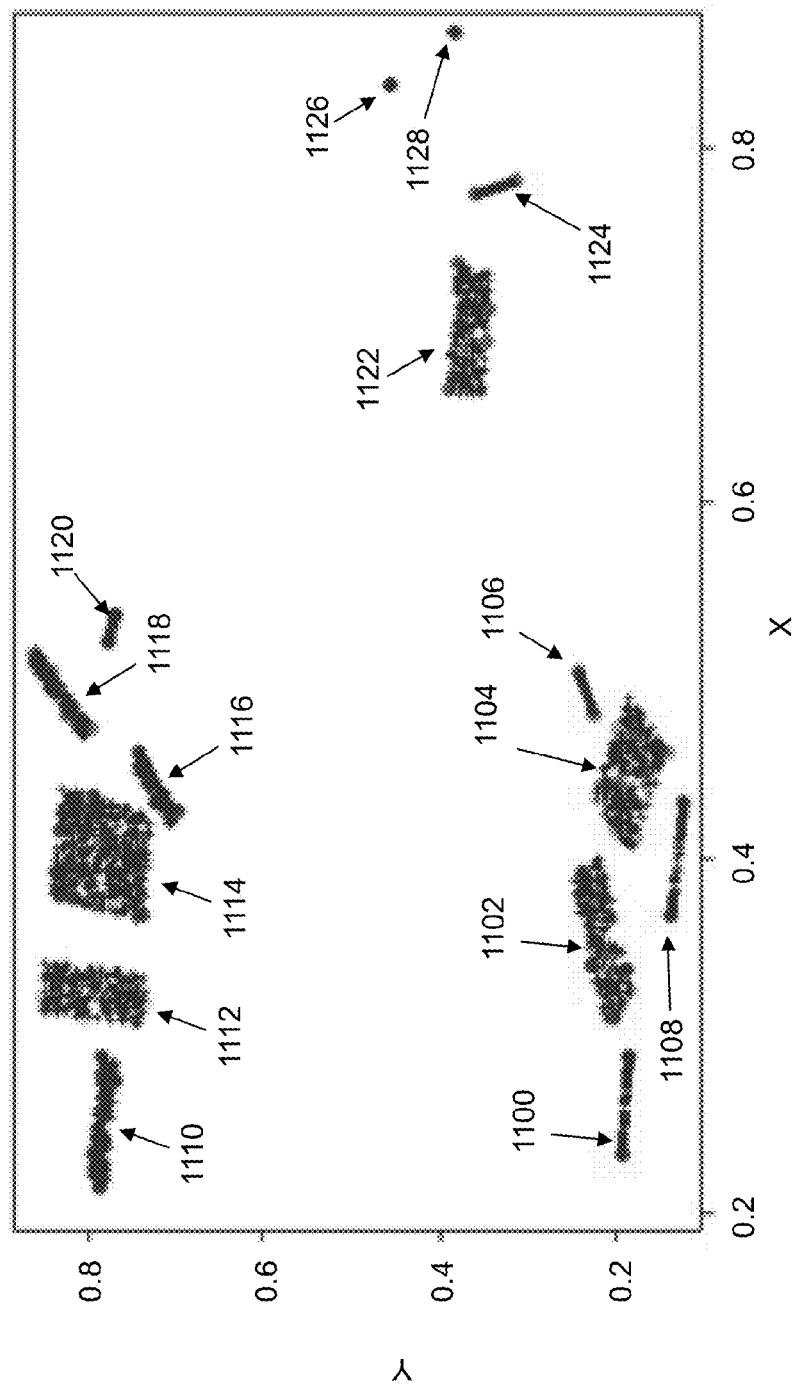
FIG. 11 depicts creation of fifteen example reference distributions created for the example dataset of FIG. 8.

Referring to FIG. 11, fifteen clusters were created for the sample dataset in FIG. 8 using a k-means clustering algorithm. Principal components analysis was performed on each of the created clusters and the boundaries were defined for each cluster based on the eigenvector and the eigenvalue determined for each dimension of each of the fifteen clusters. A reference distribution was created by defining data points within the boundaries of each of the clusters. The reference distribution includes a first cluster distribution 1100, a second cluster distribution 1102, a third cluster distribution 1104, a fourth cluster distribution 1106, a fifth cluster distribution 1108, a sixth cluster distribution 1110, a seventh cluster distribution 1112, an eighth cluster distribution 1114, a ninth cluster distribution 1116, a tenth cluster distribution 1118, an eleventh cluster distribution 1120, a twelfth cluster distribution 1122, a thirteenth cluster distribution 1124, a fourteenth cluster distribution 1126, and a fifteenth cluster distribution 1128.

With continuing reference to FIG. 2, in an operation 218, the clustering algorithm indicated in operation 206 is executed to cluster the reference distribution created in operation 206 into the defined number of clusters. The data may be received from one or more devices through communication interface 106 and/or may be received from storage in computer-readable medium 206. If the boundaries defined in operation 214 were defined after transforming the data, the reference distribution data is transformed back to the original space before executing the clustering algorithm.

In an operation 220, a second residual sum of squares is computed for the clusters defined using the reference distribution created in operation 218 (second clusters) as $W_{kb}^* = \sum_{j=1}^{k} \sum_{i=1}^{n_j^*} \|x_{i,j}^* - c_j^*\|^2$, where b is an index for a Monte Carlo iteration number, $n_j^*$ is the number of data points in cluster j of the defined second clusters, $x_{i,j}^*$ is the ith observation in cluster j of the defined second clusters, and $c_j^*$ is the centroid location of cluster j of the defined second clusters.

In an operation 222, a determination is made concerning whether or not another Monte Carlo iteration is to be executed. If another Monte Carlo iteration is to be executed, processing continues in an operation 223. If the number of Monte Carlo iterations indicated by the third indicator has been executed, processing continues in an operation 224. In an alternative embodiment, instead of pre-determining a number of Monte Carlo iterations as the number of repetitions of operations 216, 218, and 220, an evaluation may be made by a user to determine when the results appear satisfactory or stable based on a display of a line or curve showing an average or a dispersion of the number of clusters.

In operation 223, a next random seed is selected for the next Monte Carlo iteration. Processing continues in operation 216 to create another reference distribution. Because the data points included in the reference distribution are selected based on sampling within the boundary of each defined cluster, changing the random seed changes the data points included in the next reference distribution. If data access device 100 is multi-threaded, operations 216, 218, and 220 may be performed concurrently.

In operation 224, an averaged residual sum of squares is computed for the Monte Carlo iterations as $$W_k^* = \frac{1}{B} \sum_{b=1}^{B} \log\left( \sum_{j=1}^{k} \sum_{i=1}^{n_j^*} \|x_{i,j}^* - c_j^*\|^2 \right)$$

or $$W_k^* = \frac{1}{B} \sum_{b=1}^{B} \log(W_{kb}^*),$$

where B is the number of Monte Carlo iterations or the number of the plurality of times that operation 216 is repeated.

In an operation 226, a gap statistic is computed for the defined number of clusters as $gap(k) = (W_k^*) - \log(W_k)$. In operation 226, a standard deviation is also defined for the defined number of clusters as $$sd(k) = \left[ \frac{1}{B} \sum_{b=1}^{B} (\log(W_{kb}^*) - W_k^*)^2 \right]^{1/2}.$$

The gap statistic is not a constant when k=1. To avoid this, the gap statistic may be normalized. For example, the gap statistic may be normalized as $$Normgap(k) = \left(\frac{W_k^*}{W_1^*}\right) - \log\left(\frac{W_k}{W_1}\right),$$

which equals zero for k=1. As another example, the gap statistic may be normalized as $$Normgap(k) = \frac{(W_k^*) - \log(W_k)}{E((W_k^*) - \log(W_k))},$$

where E(.) is the empirical expectation. As yet another example, the gap statistic may be normalized as Normgap(k) =$(W_k^*)$−log$(W_k)$−E$((W_k^*)$−log$(W_k))$. As still another example, the gap statistic may be normalized as $$Normgap(k) = \frac{(W_k^*) - \log(W_k) - E((W_k^*) - \log(W_k))}{std((W_k^*) - \log(W_k))},$$

where std(.) is the empirical standard deviation.

In an operation 228, the computed gap statistic and the computed standard deviation are stored in association with the defined number of clusters. For example, the computed gap statistic and the computed standard deviation are stored in computer-readable medium 108 indexed by the defined number of clusters.

In an operation 230, a determination is made concerning whether or not another iteration is to be executed with a next number of clusters. For example, the determination may compare the current defined number of clusters to the minimum number of clusters or the maximum number of clusters to determine if each iteration has been executed as understood by a person of skill in the art. If another iteration is to be executed, processing continues in an operation 231. If each of the iterations has been executed, processing continues in an operation 232.

In operation 231, a next number of clusters is defined by incrementing or decrementing a counter of the number of clusters from the minimum number of clusters or the maximum number of clusters, respectively. Processing continues in operation 210 to execute the clustering algorithm with the next number of clusters as the defined number of clusters. If data access device 100 is multi-threaded, operations 210-231 may be performed concurrently.

Figure 12:
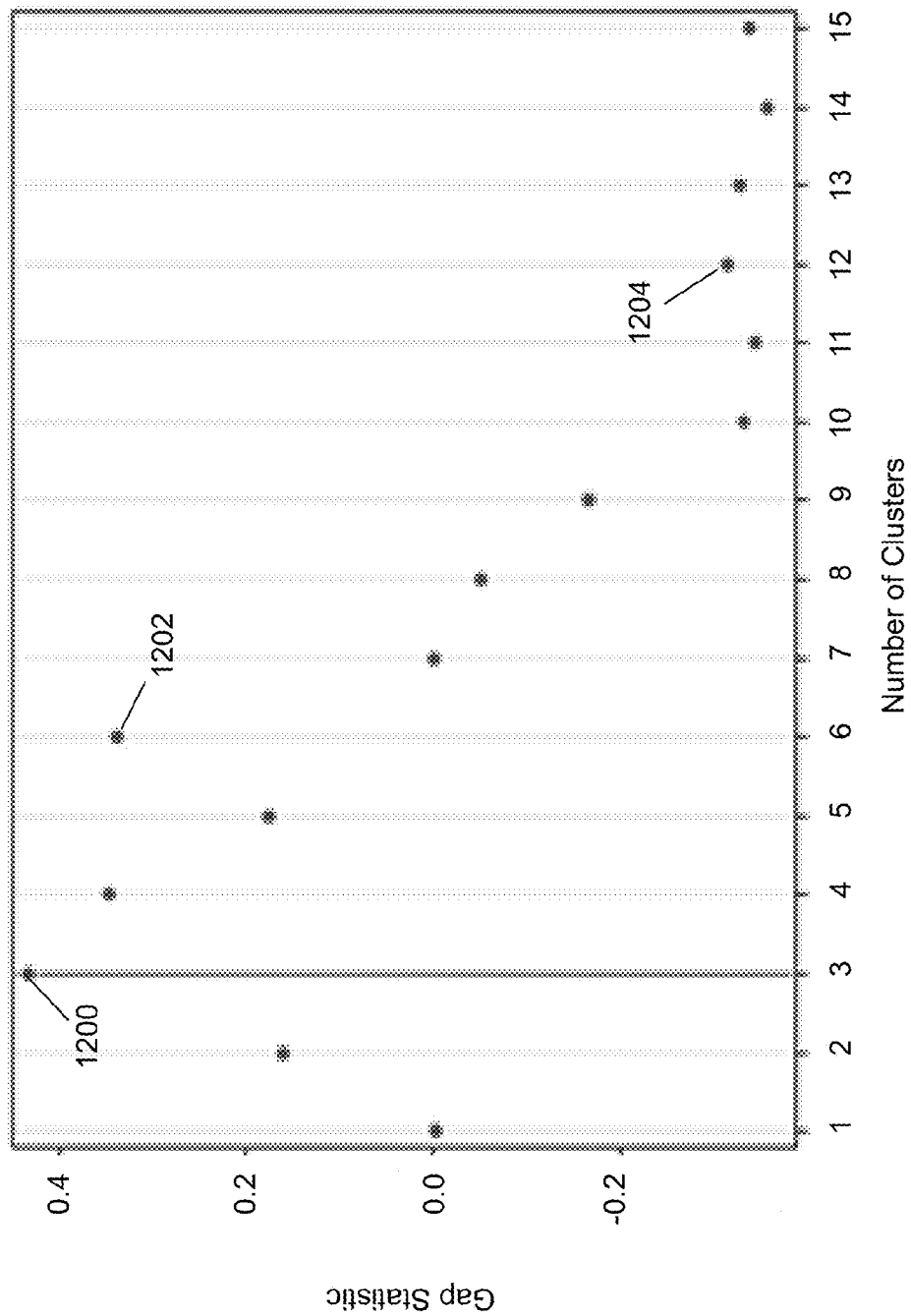
FIG. 12 is a graph showing a plot of a gap statistic value computed as a function of a number of clusters for the example dataset of FIG. 8.

In operation 232, an estimated best number of clusters for the received data is selected by comparing the gap statistic computed for each iteration of operation 226. Referring to FIG. 12, a plot of a gap statistic value computed as a function of a number of clusters for the example dataset of FIG. 8 is shown. A first local maxima for the gap statistic is indicated at a first data point 1200. A second local maxima for the gap statistic is indicated at a second data point 1202. A third local maxima for the gap statistic is indicated at a third data point 1204. First data point 1200 also has a maximum value for the computed gap statistic.

In an illustrative embodiment, the estimated best number of clusters may be selected as the first local maxima for a number of clusters greater than one. In another illustrative embodiment, the estimated best number of clusters may be selected as the local maxima that has a maximum value for the gap statistic for the number of clusters greater than one. Of course, if the gap statistic is normalized, the gap statistic for k=1 is not a local maxima. In the illustrative embodiment shown in FIG. 8, the estimated best number of clusters is three clusters based on the gap statistic of first data point 1200.

In yet another illustrative embodiment, the estimated best number of clusters may be selected as the defined number of clusters associated with a minimum defined number of clusters for which the computed gap statistic for that cluster is greater than the determined error gap of a subsequent cluster. The error gap is the difference between the computed gap statistic and the computed standard deviation as err(k)=gap(k)−sd(k).

In still another illustrative embodiment, a first number of clusters may be determined as the first local maxima for a number of clusters greater than one; a second number of clusters may be determined as the local maxima that has a maximum value for the gap statistic for the number of clusters greater than one; and a third number of clusters may be determined as the defined number of clusters associated with a minimum defined number of clusters for which the computed gap statistic for that cluster is greater than the determined error gap of the subsequent cluster. The estimated best number of clusters may be selected as the determined first number of clusters unless the determined second number of clusters equals the determined third number of clusters in which case the estimated best number of clusters is determined as the determined second number of clusters. Other rules for selecting among the first number of clusters, the second number of clusters, and third number of clusters may be defined.

In some embodiments, these techniques can produce automatically classifiable results. For example, a business practitioner can pick the best number from all three methods provided Referring to FIG. 3, a block diagram of a cluster determination system 300 is shown in accordance with an illustrative embodiment. In an illustrative embodiment, cluster determination system 300 may include grid systems 132, data access systems 302, grid control device 130, and a network 301. Grid systems 132 store a cube of data. Data access systems 302 access data stored in the cube of data distributed to the grid systems 132. Grid control device 130 coordinates and controls access by data access systems 302 to the data stored by the grid systems 132. One or more components of cluster determination system 300 may support multithreading, as understood by a person of skill in the art.

The components of cluster determination system 300 may be located in a single room or adjacent rooms, in a single facility, and/or may be distributed geographically from one another. Each of grid systems 132, data access systems 302, and grid control device 130 may be composed of one or more discrete devices.

Network 301 may include one or more networks of the same or different types. Network 301 can be any type of wired and/or wireless public or private network including a cellular network, a local area network, a wide area network such as the Internet, etc. Network 301 further may comprise sub-networks and consist of any number of devices.

Data access systems 302 can include any number and type of computing devices that may be organized into subnets. Data access device 100 is an example computing device of data access systems 302. The computing devices of data access systems 302 send and receive communications through network 301 to/from another of the one or more computing devices of data access systems 302, to/from grid systems 132, and/or to/from grid control device 130. The one or more computing devices of data access systems 302 may include computers of any form factor such as a laptop 308, a desktop 306, a smart phone 304, a personal digital assistant, an integrated messaging device, a tablet computer, etc. The one or more computing devices of data access systems 302 may communicate using various transmission media that may be wired and/or wireless as understood by those skilled in the art.

Figure 3:
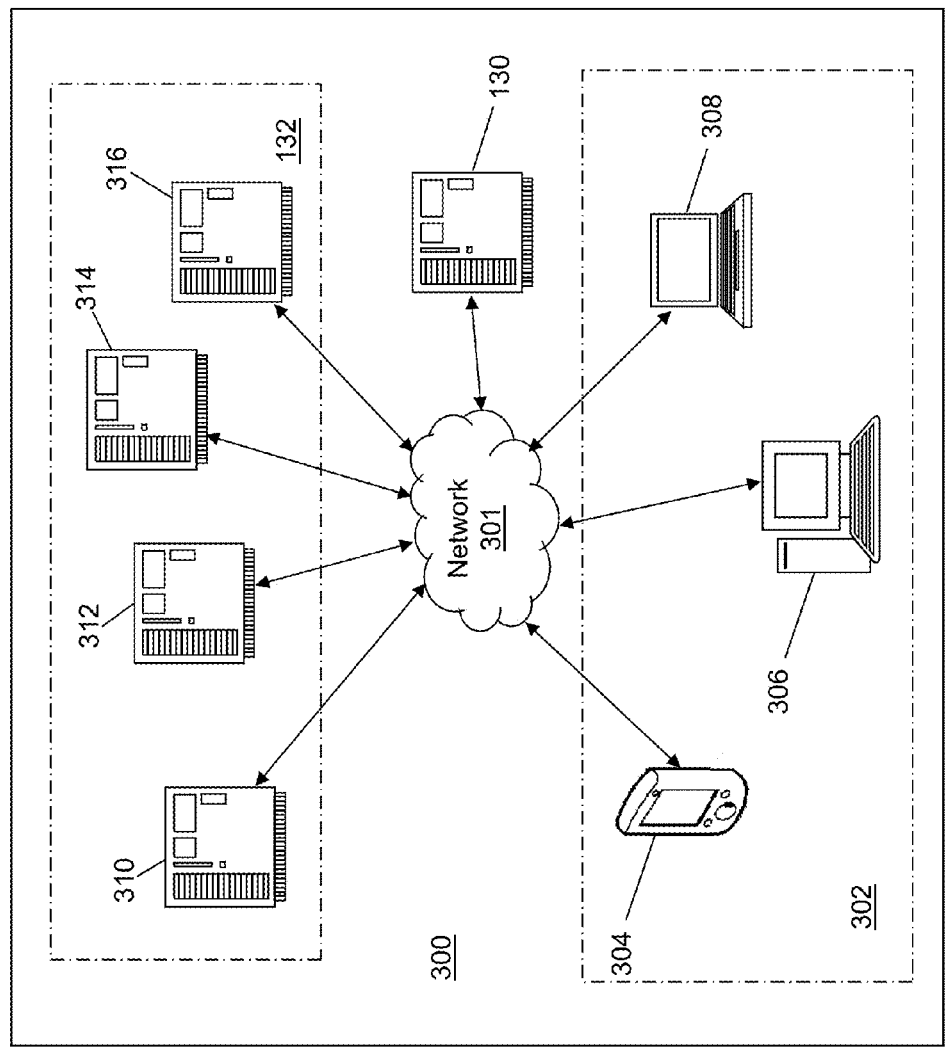
FIG. 3 depicts a block diagram of a cluster determination system in accordance with an illustrative embodiment.

For illustration, FIG. 3 represents grid systems 132 with a first server computer 310, a second server computer 312, a third server computer 314, and a fourth server computer 316. Grid systems 132 can include any number and form factor of computing devices that may be organized into subnets. The computing devices of grid systems 132 send and receive communications through network 301 to/from another of the one or more computing devices of grid systems 132, to/from grid control device 130, and/or to/from data access systems 302. The one or more computing devices of grid systems 132 may communicate using various transmission media that may be wired and/or wireless as understood by those skilled in the art.

In the illustrative embodiment, grid control device 130 is represented as a server computing device though grid control device 130 may include one or more computing devices of any form factor that may be organized into subnets. Grid control device 130 sends and receives communications through network 301 to/from grid systems 132 and/or to/from data access systems 302. Grid control device 130 may communicate using various transmission media that may be wired and/or wireless as understood by those skilled in the art.

Grid control device 130 and grid systems 132 may be implemented as a multi-node Hadoop® cluster, as understood by a person of skill in the art. Apache™ Hadoop® is an open-source software framework for distributed computing.

Figure 4:
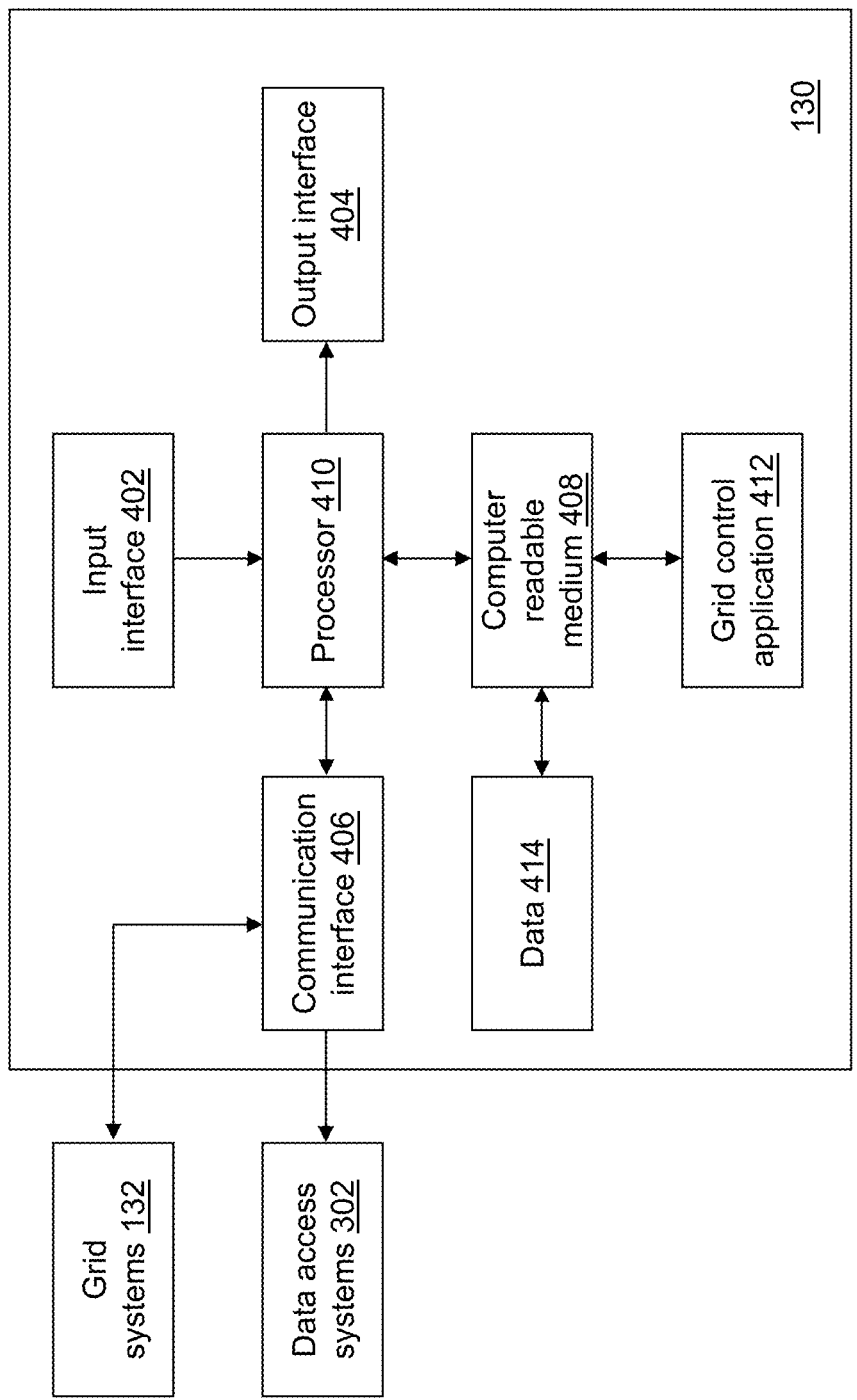
FIG. 4 depicts a block diagram of a grid control device of the cluster determination system of FIG. 3 in accordance with an illustrative embodiment.

Referring to FIG. 4, a block diagram of grid control device 130 is shown in accordance with an example embodiment. Grid control device 130 may include a second input interface 402, a second output interface 404, a second communication interface 406, a second computer-readable medium 408, a second processor 410, a grid control application 412, and second data 414. Fewer, different, and additional components may be incorporated into grid control device 130.

Second input interface 402 provides the same or similar functionality as that described with reference to input interface 102 of data access device 100 though referring to grid control device 130. Second output interface 404 provides the same or similar functionality as that described with reference to output interface 104 of data access device 100 though referring to grid control device 130. Second communication interface 406 provides the same or similar functionality as that described with reference to communication interface 106 of data access device 100 though referring to grid control device 130. Data and messages may be transferred between grid control device 130 and grid systems 132 and/or data access systems 302 using second communication interface 406. Second computer-readable medium 408 provides the same or similar functionality as that described with reference to computer-readable medium 108 of data access device 100 though referring to grid control device 130. Second processor 410 provides the same or similar functionality as that described with reference to processor 110 of data access device 100 though referring to grid control device 130.

Grid control application 412 performs operations associated with controlling access to the cube of data distributed across grid systems 132. The cube of data is created by distributing the data into data subcubes stored at a plurality of computing devices (grid nodes) of grid systems 132. For illustration, one or more rows of the cube of data are stored to each of the grid systems 132.

Some or all of the operations described herein may be embodied in grid control application 412. The operations may be implemented using hardware, firmware, software, or any combination of these methods. Referring to the example embodiment of FIG. 4, grid control application 412 is implemented in software (comprised of computer-readable and/or computer-executable instructions) stored in second computer-readable medium 408 and accessible by second processor 422 for execution of the instructions that embody the operations of grid control application 412. Grid control application 412 may be written using one or more programming languages, assembly languages, scripting languages, etc. Grid control application 412 may be implemented as a Web application.

Data 414 comprises data used by grid control application in support of clustering data and/or a portion of data matrix 124.

Figure 5:
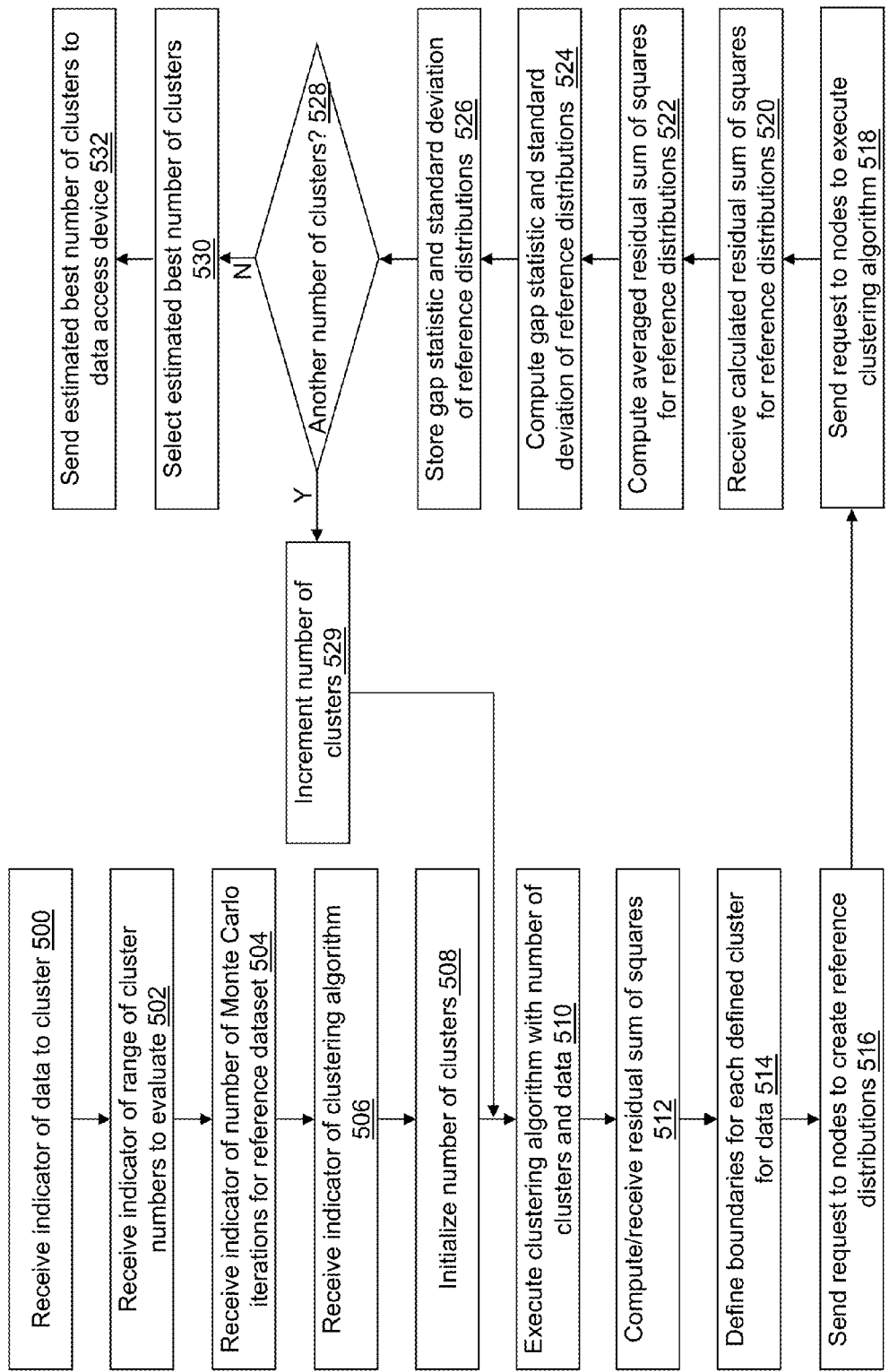
FIG. 5 depicts a flow diagram illustrating examples of operations performed by the grid control device of FIG. 4 in accordance with an illustrative embodiment.

Referring to FIG. 5, example operations associated with grid control application 412 are described. Additional, fewer, or different operations may be performed depending on the embodiment. The order of presentation of the operations of FIG. 5 is not intended to be limiting. Although some of the operational flows are presented in sequence, the various operations may be performed in various repetitions, concurrently, and/or in other orders than those that are illustrated. For example, a user may execute grid control application 412, which causes presentation of a first user interface window, which may include a plurality of menus and selectors such as drop down menus, buttons, text boxes, hyperlinks, etc. associated with grid control application 412 as understood by a person of skill in the art. As further understood by a person of skill in the art, various operations may be performed in parallel, for example, using threads.

Similar to operation 200, in an operation 500, a fifth indicator of data to cluster is received. The fifth indicator may be received from a user of grid control device 130, from computer-readable medium 408, or from data access device 100 through second communication interface 406. The fifth indicator may be the same or different from the first indicator. For example, the fifth indicator may be a pointer to a data file; whereas the first indicator may be a string identifying the data file name.

Similar to operation 202, in an operation 502, a sixth indicator of a range of numbers of clusters to evaluate is received. The sixth indicator may be received from a user of grid control device 130, from computer-readable medium 408, or from data access device 100 through second communication interface 406. The sixth indicator may be the same or different from the second indicator. For example, the sixth indicator may include two or three numerical values (minimum, maximum, increment); whereas, the third indicator may be one or more radio button selection indicators.

Similar to operation 204, in an operation 504, a seventh indicator of a number of Monte Carlo iterations to execute for a reference dataset is received. The seventh indicator may be received from a user of grid control device 130, from computer-readable medium 408, or from data access device 100 through second communication interface 406. The seventh indicator may be the same or different from the third indicator. For example, the seventh indicator may be a numerical value; whereas, the third indicator may be a radio button selection indicator.

Similar to operation 206, in an operation 506, an eighth indicator of a clustering algorithm to execute to cluster the data and the reference dataset is received. The eighth indicator may be the same or different from the fourth indicator. For example, the eighth indicator may be a pointer to a clustering algorithm; whereas the first indicator may be a string identifying the clustering algorithm name.

Similar to operation 208, in an operation 508, a number of clusters is initialized. Similar to operation 210, in an operation 510, the clustering algorithm indicated in operation 506 is executed to cluster the data indicated in operation 500 into the defined number of clusters. The number of clusters may be defined based on the initialized number of clusters in operation 508 or in an operation 529. Distributed execution of the clustering algorithm may be performed using grid systems 132.

Similar to operation 212, in an operation 512, a first residual sum of squares is computed for the defined clusters. When distributed execution of the clustering algorithm is performed using grid systems 132, each grid node may compute the first residual sum of squares and send the computed first residual sum of squares to grid control device 130.

Similar to operation 214, in an operation 514, a boundary is defined for each of the clusters defined in operation 510. When the data is transformed after clustering, one or more nodes of grid systems 132 may be sent the data (i.e., raw data or covariance matrix) of one cluster and requested to compute the eigenvectors and eigenvalues for that cluster. The eigenvectors and eigenvalues are returned to the grid control device 130.

In an operation 516, a request is sent to one or more grid nodes of grid system 132 to create a reference distribution. A reference distribution is created for each Monte Carlo iteration using grid systems 132. Similar to operation 216, each reference distribution includes a new plurality of data points created within the defined boundary of at least one cluster of the defined clusters. The grid control device 130 may send the eigenvectors and eigenvalues to one or more nodes of grid systems 132 to generate the reference distributions based on these values when transformed data is used.

In an operation 518, a request is sent to one or more grid nodes of grid system 132 to cluster the reference distributions created in operation 516 into the defined number of clusters. If the boundaries defined in operation 514 were defined after transforming the data, the reference distribution data is transformed back to the original space before executing the clustering algorithm.

In an operation 520, residual sums of squares are received from grid systems 132. The node that clusters the reference distribution computes a residual sum of squares for the clusters and sends the computed residual sums of squares to the grid control node 130.

Similar to operation 224, in operation 522, an averaged residual sum of squares is computed for the Monte Carlo iterations as $$W_k^* = \frac{1}{B}\sum_{b=1}^{B} \log\left(\sum_{j=1}^{k}\sum_{i=1}^{n_j^*} \|x_{i,j}^* - c_j^*\|^2\right)$$

or $$Wk^* = \frac{1}{B}\sum_{b=1}^{B} \log(W_{kb}^*),$$

where B is the number of Monte Carlo iterations.

Similar to operation 226, in an operation 524, a gap statistic and a standard deviation are computed for the defined number of clusters.

Similar to operation 228, in an operation 526, the computed gap statistic and the computed standard deviation are stored in association with the defined number of clusters. For example, the computed gap statistic and the computed standard deviation are stored in second computer-readable medium 408 and/or in computer-readable medium 108 indexed by the defined number of clusters.

Similar to operation 230, in an operation 528, a determination is made concerning whether or not another iteration is to be executed with a next number of clusters. If another iteration is to be executed, processing continues in an operation 529. If each of the iterations has been executed, processing continues in an operation 530.

Similar to operation 231, in operation 529, a next number of clusters is defined. Processing continues in operation 510 to execute the clustering algorithm with the next number of clusters as the defined number of clusters.

Similar to operation 232, in operation 530, an estimated best number of clusters for the received data is selected by comparing the gap statistic computed for each iteration of operation 524.

In an operation 532, the determined estimated best number of clusters is sent to the data access device 100.

Distributed execution of the operations of FIG. 5 may be performed using grid systems 132 in other ways than those described. For example, grid nodes may be used to perform various combinations of operations 510 to 528 as understood by a person of skill in the art.

Figure 6:
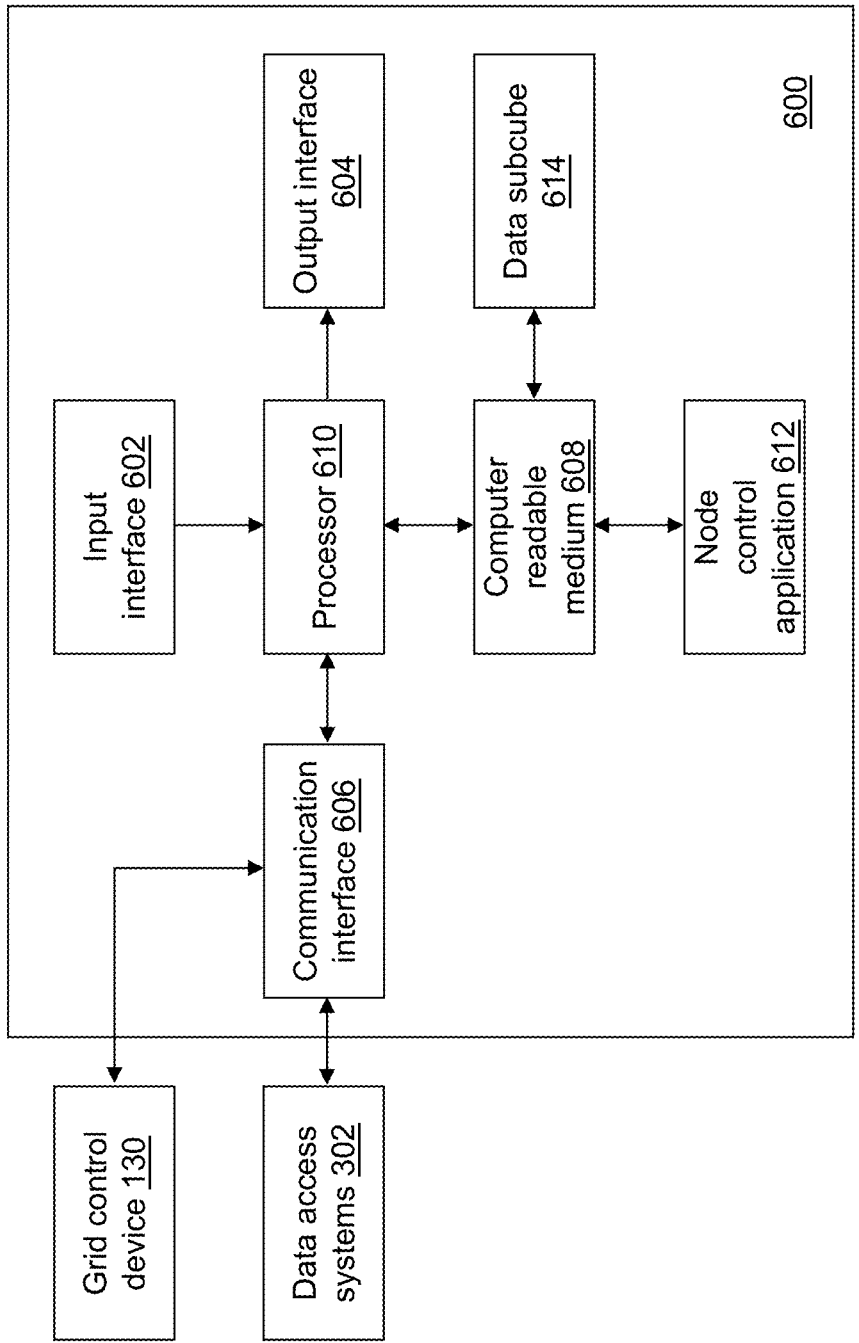
FIG. 6 depicts a block diagram of a grid node device of the cluster determination system of FIG. 3 in accordance with an illustrative embodiment.

Referring to FIG. 6, a block diagram of a grid node device 600 is shown in accordance with an illustrative embodiment. Grid node device 600 is an example computing device of grid systems 132. Grid node device 600 may include a third input interface 602, a third output interface 604, a third communication interface 606, a third computer-readable medium 608, a third processor 610, a node control application 612, and a data subcube 614. Fewer, different, and additional components may be incorporated into grid node device 600.

Third input interface 602 provides the same or similar functionality as that described with reference to input interface 102 of data access device 100 though referring to grid node device 600. Third output interface 604 provides the same or similar functionality as that described with reference to output interface 104 of data access device 100 though referring to grid node device 600. Third communication interface 606 provides the same or similar functionality as that described with reference to communication interface 106 of data access device 100 though referring to grid node device 600. Data and messages may be transferred between grid node device 600 and grid control device 130 and/or the data access systems 302 using third communication interface 606. Third computer-readable medium 608 provides the same or similar functionality as that described with reference to computer-readable medium 108 of data access device 100 though referring to grid node device 600. Third processor 610 provides the same or similar functionality as that described with reference to processor 110 of data access device 100 though referring to grid node device 600.

Node control application 612 performs operations associated with controlling access to the data stored in data subcube 614, with creating a reference distribution, and/or with executing a clustering algorithm on data. Some or all of the operations described herein may be embodied in node control application 612. The operations may be implemented using hardware, firmware, software, or any combination of these methods. Referring to the example embodiment of FIG. 6, node control application 612 is implemented in software (comprised of computer-readable and/or computer-executable instructions) stored in third computer-readable medium 608 and accessible by third processor 610 for execution of the instructions that embody the operations of node control application 612. Node control application 612 may be written using one or more programming languages, assembly languages, scripting languages, etc. Node control application 612 may be implemented as a Web application.

Data subcube 614 stores a portion of a cube of data distributed across grid systems 132 with each computing device of the grid systems 132 storing a different portion of the cube of data. Grid control device 130 further may store a portion of the cube of data. A cube of data is a multidimensional dataset that can have any number of dimensions. For illustration, each cell of the cube holds a value that represents some measure of a business, such as sales, profits, expenses, budget, forecast, etc. possibly as a function of product, location, etc.

A user may execute clustering application 122 that interacts with grid control application 412 by requesting that grid control device 130 cluster a dataset. Grid control application 412 triggers processing by node control application 612 executing at each grid node of the grid systems 132. Of course, any number of different users may be accessing the cube of data at any given time.

Various levels of integration between the components of cluster determination system 300 may be implemented without limitation as understood by a person of skill in the art. For example, node control application 612 and grid control application 412 may be the same or different applications or part of an integrated, distributed application supporting some or all of the same or additional types of functionality as described herein. As another example, clustering application 122 and grid control application 412 may be the same or different applications or part of an integrated, distributed application supporting some or all of the same or additional types of functionality as described herein.

Figure 7B:
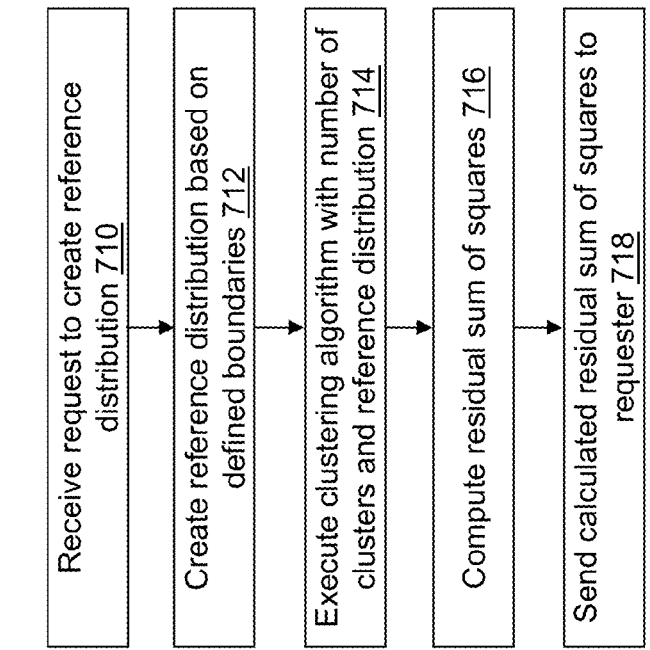
FIGS. 7a and 7b depict flow diagrams illustrating examples of operations performed by the grid node device of FIG. 6 in accordance with an illustrative embodiment.
Figure 7A:
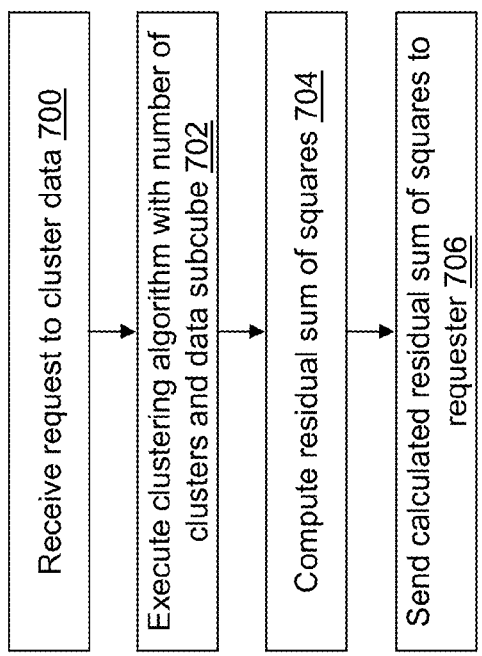

Referring to FIGS. 7a and 7b, example operations associated with node control application 612 are described. Additional, fewer, or different operations may be performed depending on the embodiment. The order of presentation of the operations of FIGS. 7a and 7b is not intended to be limiting. Although some of the operational flows are presented in sequence, the various operations may be performed in various repetitions, concurrently, and/or in other orders than those that are illustrated.

The operations of node control application 612 executed at each node may differ. For example, grid control device 130 may allocate some nodes of grid systems 132 to perform clustering of the data indicated in operation 510. Grid control device 130 may allocate the same or different nodes of grid systems 132 to create the reference distributions indicated in operation 516. Grid control device 130 may allocate the same or different nodes of grid systems 132 to perform clustering of the created reference distributions indicated in operation 518.

Referring to FIG. 7a, in an operation 700, a request to cluster data stored in data subcube 614 is received. Similar to operation 210, in an operation 702, the clustering algorithm indicated is executed to cluster some or all of the data in data subcube 614 based on information included in the request. Similar to operation 212, in an operation 704, a residual sum of squares is computed. In an operation 706, the computed residual sum of squares is sent to grid control node 130.

Referring to FIG. 7b, in an operation 710, a request to create a reference distribution is received. Similar to operation 216, in an operation 712, the reference distribution is created based on boundaries defined in the request and a number of data points to create for each cluster. Similar to operation 218, in an operation 714, the clustering algorithm indicated is executed to cluster the reference distribution created in operation 712 into the defined number of clusters. If the boundaries defined in the request were defined after transforming the data, the reference distribution data is transformed back to the original space before executing the clustering algorithm. A separate request to cluster the reference distribution may be received from grid control device 130 (i.e., operation 518) or the clustering may be executed automatically as part of the request to create the reference distribution (no operation 518).

Similar to operation 220, in an operation 716, a residual sum of squares is computed. In an operation 718, the computed residual sum of squares is sent to grid control node 130.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   receive data to cluster;
   define a number of clusters to create;
   (a) determine centroid locations for the defined number of clusters using a clustering algorithm and the received data to define clusters;
   (b) define boundaries for each of the defined clusters by
       determining an eigenvector and an eigenvalue for each dimension of each cluster of the defined clusters using principal components analysis;
       determining a length for each dimension of each cluster as a proportion of the determined eigenvalue for the respective dimension; and
       defining the boundaries for each cluster of the defined clusters as a box with a center of the box as the determined centroid location of the respective cluster, a first boundary point for each dimension defined as the center plus the determined length of the respective dimension aligned with the determined eigenvector of the respective dimension, and a second boundary point for each dimension defined as the center minus the determined length of the respective dimension aligned with the eigenvector of the respective dimension;

(c) create a reference distribution that includes a plurality of data points, wherein the plurality of data points are within the defined boundary of at least one cluster of the defined clusters;

(d) determine second centroid locations for the defined number of clusters using the clustering algorithm and the created reference distribution to define second clusters;

(e) compute a gap statistic for the defined number of clusters based on a comparison between a first residual sum of squares computed for the defined clusters and a second residual sum of squares computed for the defined second clusters;

(f) repeat (a) to (e) with a next number of clusters to create as the defined number of clusters; and (g) determine an estimated best number of clusters for the received data by comparing the gap statistic computed for each iteration of (e).

2. The computer-readable medium of claim 1, wherein the gap statistic for the defined number of clusters is computed using gap(k)=log $(W_k^*)$–log$(W_k)$, where $$W_k = \sum_{j=1}^{k} \sum_{i=1}^{n_j} \|x_{i,j} - c_j\|^2$$

is the first residual sum of squares computed for the defined clusters, and $$W_k^* = \sum_{j=1}^{k} \sum_{i=1}^{n_j^*} \|x_{i,j}^* - c_j^*\|^2$$

is the second residual sum of squares computed for the defined second clusters, where k is the defined number of clusters, $n_j$ is the number of data points in cluster j of the defined clusters, $x_{i,j}$ is the ith data point in cluster j of the defined clusters, $c_j$ is the centroid location of cluster j of the defined clusters, $n_j^*$ is the number of data points in cluster j of the defined second clusters, $x_{i,j}^*$ is the ith data point in cluster j of the defined second clusters, and $c_j^*$ is the centroid location of cluster j of the defined second clusters.

3. The computer-readable medium of claim 2, wherein (c) and (d) are repeated a plurality of times and wherein $$W_k^* = \frac{1}{B} \sum_{b=1}^{B} \sum_{j=1}^{k} \sum_{i=1}^{n_j^*} \|x_{i,j}^* - c_j^*\|^2,$$

where B is a number of the plurality of times.

4. The computer-readable medium of claim 2, wherein $n_j^*$ is selected based on $n_j$ for cluster j.

5. The computer-readable medium of claim 1, wherein the clustering algorithm is a k-means algorithm.

6. The computer-readable medium of claim 1, wherein the clustering algorithm is a Ward's minimum-variance algorithm.

7. The computer-readable medium of claim 1, wherein the number of clusters to create is defined as a minimum number of clusters in a range of numbers of clusters to evaluate.

8. The computer-readable medium of claim 7, wherein the next number of clusters is defined in (f) by incrementing the defined number of clusters for each iteration of (f).

9. The computer-readable medium of claim 8, wherein (f) is repeated until the next number of clusters is greater than a maximum number of clusters in the range of numbers of clusters to evaluate.

10. The computer-readable medium of claim 1, wherein the plurality of data points are created from a uniform distribution defined within the defined boundary of at least one cluster of the defined clusters.

11. The computer-readable medium of claim 1, wherein the proportion of the determined eigenvalue for the respective dimension is between 0.75 and 1.0.

12. The computer-readable medium of claim 1, wherein the estimated best number of clusters is determined as the defined number of clusters associated with a maximum value of the computed gap statistic.

13. The computer-readable medium of claim 1, wherein the estimated best number of clusters is determined as the defined number of clusters associated with a first local maxima value of the computed gap statistic.

14. The computer-readable medium of claim 1, wherein the computer-readable instructions further cause the computing device to:
after (d) and before (f), compute a standard deviation of the second residual sum of squares; and
determine an error gap as a difference between the computed gap statistic and the computed standard deviation, wherein the estimated best number of clusters is determined as the defined number of clusters associated with a minimum defined number of clusters for which the computed gap statistic for that cluster is greater than the determined error gap of a subsequent cluster.

15. The computer-readable medium of claim 1, wherein the computer-readable instructions further cause the computing device to:
after (d) and before (f),
compute a standard deviation of the second residual sum of squares; and
determine an error gap as a difference between the computed gap statistic and the computed standard deviation; and
after (d) and before (g),
determine a first number of clusters as the defined number of clusters associated with a first local maxima value of the computed gap statistic; and
determine a second number of clusters as the defined number of clusters associated with a maximum value of the computed gap statistic;
determine a third number of clusters as the defined number of clusters associated with a minimum defined number of clusters for which the computed gap statistic for that cluster is greater than the determined error gap of a subsequent cluster,
wherein the estimated best number of clusters is determined as the determined first number of clusters unless the determined second number of clusters equals the determined third number of clusters in which case the estimated best number of clusters is determined as the determined second number of clusters.

16. A computing device comprising:
a processor; and
a non-transitory computer-readable medium operably coupled to the processor, the computer-readable medium having computer-readable instructions stored thereon that, when executed by the processor, cause the computing device to
receive data to cluster;
define a number of clusters to create;

(a) determine centroid locations for the defined number of clusters using a clustering algorithm and the received data to define clusters;
(b) define boundaries for each of the defined clusters by
  determining an eigenvector and an eigenvalue for each dimension of each cluster of the defined clusters using principal components analysis;
  determining a length for each dimension of each cluster as a proportion of the determined eigenvalue for the respective dimension; and
  defining the boundaries for each cluster of the defined clusters as a box with a center of the box as the determined centroid location of the respective cluster, a first boundary point for each dimension defined as the center plus the determined length of the respective dimension aligned with the determined eigenvector of the respective dimension, and a second boundary point for each dimension defined as the center minus the determined length of the respective dimension aligned with the eigenvector of the respective dimension;
(c) create a reference distribution that includes a plurality of data points, wherein the plurality of data points are within the defined boundary of at least one cluster of the defined clusters;
(d) determine second centroid locations for the defined number of clusters using the clustering algorithm and the created reference distribution to define second clusters;
(e) compute a gap statistic for the defined number of clusters based on a comparison between a first residual sum of squares computed for the defined clusters and a second residual sum of squares computed for the defined second clusters;
(f) repeat (a) to (e) with a next number of clusters to create as the defined number of clusters; and
(g) determine a cluster number for the received data by comparing the gap statistic computed for each iteration of (e).

17. The computing device of claim 16, wherein the plurality of data points are created from a uniform distribution defined within the defined boundary of at least one cluster of the defined clusters.

18. The computing device of claim 16, wherein the proportion of the determined eigenvalue for the respective dimension is between 0.75 and 1.0.

19. A system comprising:
a first computing device comprising
  a first processor; and
  a first computer-readable medium operably coupled to the first processor, the first computer-readable medium having first computer-readable instructions stored thereon that, when executed by the first processor, cause the first computing device to:
    receive data to cluster;
    define a number of clusters to create;
    (a) determine centroid locations for the defined number of clusters using a clustering algorithm and the received data to define clusters;
    (b) define boundaries for each of the defined clusters by
      determining an eigenvector and an eigenvalue for each dimension of each cluster of the defined clusters using principal components analysis;
      determining a length for each dimension of each cluster as a proportion of the determined eigenvalue for the respective dimension; and
      defining the boundaries for each cluster of the defined clusters as a box with a center of the box as the determined centroid location of the respective cluster, a first boundary point for each dimension defined as the center plus the determined length of the respective dimension aligned with the determined eigenvector of the respective dimension, and a second boundary point for each dimension defined as the center minus the determined length of the respective dimension aligned with the eigenvector of the respective dimension;
    (c) send a request to a second computing device to define second clusters based on the defined boundaries;
    (d) receive a first residual sum of squares computed for the defined second clusters;
    (e) compute a gap statistic for the defined number of clusters based on a comparison between a second residual sum of squares computed for the defined clusters and the first residual sum of squares computed for the defined second clusters;
    (f) repeat (a) to (e) with a next number of clusters to create as the defined number of clusters; and
    (g) determine a cluster number for the received data by comparing the gap statistic computed for each iteration of (e); and
the second computing device comprising
  a second processor; and
  a second computer-readable medium operably coupled to the second processor, the second computer-readable medium having second computer-readable instructions stored thereon that, when executed by the second processor, cause the second computing device to:
    receive a request from the first computing device to define second clusters based on the defined boundaries;
    create a reference distribution that includes a plurality of data points, wherein the plurality of data points are within the defined boundary of at least one cluster of the defined clusters;
    determine second centroid locations for the defined number of clusters using the clustering algorithm and the created reference distribution to define second clusters;
    compute the first residual sum of squares for the defined second clusters; and
    send the computed first residual sum of squares to the first computing device.

20. The system of claim 19, wherein the first computing device is a grid control device and the second computing device is a grid node of a plurality of grid nodes controlled by the grid control device.

21. The system of claim 19, wherein the plurality of data points are created from a uniform distribution defined within the defined boundary of at least one cluster of the defined clusters.

22. The system of claim 19, wherein the proportion of the determined eigenvalue for the respective dimension is between 0.75 and 1.0.

23. A method of determining a number of clusters for a dataset, the method comprising:
receiving data to cluster;
defining a number of clusters to create;

(a) determining centroid locations for the defined number of clusters using a clustering algorithm and the received data to define clusters;
(b) defining boundaries for each of the defined clusters by
   determining an eigenvector and an eigenvalue for each dimension of each cluster of the defined clusters using principal components analysis;
   determining a length for each dimension of each cluster as a proportion of the determined eigenvalue for the respective dimension; and
   defining the boundaries for each cluster of the defined clusters as a box with a center of the box as the determined centroid location of the respective cluster, a first boundary point for each dimension defined as the center plus the determined length of the respective dimension aligned with the determined eigenvector of the respective dimension, and a second boundary point for each dimension defined as the center minus the determined length of the respective dimension aligned with the eigenvector of the respective dimension;
(c) creating a reference distribution that includes a plurality of data points, wherein the plurality of data points are within the defined boundary of at least one cluster of the defined clusters;
(d) determining second centroid locations for the defined number of clusters using the clustering algorithm and the created reference distribution to define second clusters;
(e) computing, by a computing device, a gap statistic for the defined number of clusters based on a comparison between a first residual sum of squares computed for the defined clusters and a second residual sum of squares computed for the defined second clusters;
(f) repeating, by the computing device, (a) to (e) with a next number of clusters to create as the defined number of clusters; and
(g) determining, by the computing device, an estimated best number of clusters for the received data by comparing the gap statistic computed for each iteration of (e).

24. The method of claim 23, wherein the plurality of data points are created from a uniform distribution defined within the defined boundary of at least one cluster of the defined clusters.

25. The method of claim 23, wherein the proportion of the determined eigenvalue for the respective dimension is between 0.75 and 1.0.

* * * * *